US012634518B2

(12) United States Patent (10) Patent No.: US 12,634,518 B2
Kato et al. (45) Date of Patent: May 19, 2026

(54) INFORMATION PROCESSING DEVICE AND METHOD

(71) Applicant: SONY GROUP CORPORATION, Tokyo (JP)

(72) Inventors: Tsuyoshi Kato, Kanagawa (JP); Satoru Kuma, Tokyo (JP); Ohji Nakagami, Tokyo (JP); Hiroyuki Yasuda, Saitama (JP); Koji Yano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 19/009,644

(22) Filed: Jan. 3, 2025

(65) Prior Publication Data

US 2025/0142120 A1 May 1, 2025

Related U.S. Application Data

(63) Continuation of application No. 17/790,393, filed as application No. PCT/JP2020/048358 on Dec. 24, 2020, now Pat. No. 12,231,684.

(30) Foreign Application Priority Data

Jan. 7, 2020 (JP) ................................. 2020-000679

(51) Int. Cl.
  *H04N 19/597* (2014.01)
  *H04N 19/30* (2014.01)
  *H04N 19/50* (2014.01)
(52) U.S. Cl.
  CPC ........... *H04N 19/597* (2014.11); *H04N 19/30* (2014.11); *H04N 19/50* (2014.11)
(58) Field of Classification Search
  CPC ....... H04N 19/597; H04N 19/30; H04N 19/50
  See application file for complete search history.

(56) References Cited

U.S. PATENT DOCUMENTS

| | | | |
|---|---|---|---|
| 11,212,519 B2 | 12/2021 | Sugio | |
| 12,505,577 B2 * | 12/2025 | Kuma | ..................... G06T 9/001 |

(Continued)

FOREIGN PATENT DOCUMENTS

| | | |
|---|---|---|
| IL | 112425 A | 1/1998 |
| WO | WO-2018066990 A1 | 4/2018 |

(Continued)

OTHER PUBLICATIONS

Hur et al., [G-PCC][New Proposal] on improved spatial scalable lifting, International Organisation for Standardisation Coding of Moving Pictures and Audio, ISO/IEC JTC1/SC29/WG11, Oct. 2019, pp. 1-7, Geneva, CH.

(Continued)

*Primary Examiner* — Jae N Noh
(74) *Attorney, Agent, or Firm* — Paratus Law Group, PLLC

(57) ABSTRACT

There is provided an information processing device and method capable of suppressing a reduction in encoding efficiency. When performing, for attribute information of each point of a point cloud that represents an object having a three-dimensional shape as a set of points, hierarchization of the attribute information by recursively repeating classification of a prediction point for deriving a difference value between the attribute information and a predicted value of the attribute information and a reference point used for deriving the predicted value with respect to the reference point, the reference point is set on the basis of a centroid of points. The present disclosure can be applied to, for example, an information processing device, an image processing device, an encoding device, a decoding device, an electronic device, an information processing method, a program, and the like.

6 Claims, 40 Drawing Sheets

(56) References Cited

U.S. PATENT DOCUMENTS

| | | | |
|---|---|---|---|
| 2022/0188578 A1 | 6/2022 | Hu et al. | |
| 2023/0273976 A1 | 8/2023 | Hu et al. | |
| 2024/0232460 A1* | 7/2024 | Cruz ..................... | G06F 30/15 |

FOREIGN PATENT DOCUMENTS

| | | |
|---|---|---|
| WO | WO 2019/055772 A1 | 3/2019 |
| WO | WO 2019/065298 A1 | 4/2019 |
| WO | WO 2019/240286 A1 | 12/2019 |
| WO | WO 2019/244931 A1 | 12/2019 |

OTHER PUBLICATIONS

Mammou et al., Lifting Scheme for Lossy Attribute Encoding in TMC1, International Organisation for Standardisation Coding of Moving Pictures and Audio, ISO/IEC JTC1/SC29/WG11, Apr. 2018, pp. 1-9, San Diego.

Nakagami et al., [G-PCC] Spatial scalability support for G-PCC, International Organisation for Standardisation Coding of Moving Pictures and Audio, ISO/IEC JTC1/SC29/WG11, Mar. 2019, pp. 1-15, Geneva, CH.

Mekuria et al., Design, Implementation and Evaluation of a Point Cloud Codec for Tele-Immersive Video, IEEE Transactions on Circuits and Systems for Video Technology, Jan. 2016, pp. 1-14.

Satoru Kuma (Sony) et al: "[G-PCC](New Proposal) CE13.15 Related on improved LoD generation for spatial scalability", 129. MPEG Meeting; Jan. 13, 2020-Jan. 17, 2020; Jan. 8, 2020 (Jan. 8, 2020), (Motion Picture Expert Group or ISO/IEC JTC1 /SC29/ WG11), No. m52331, Brussels, XP030224959.

"G-PCC codec description", 128. MPEG Meeting; Oct. 7, 2019-Oct. 11, 2019; Geneva; (Motion Picture Expert Group or ISO/IEC JTC1 /SC29/WG11), Dec. 18, 2019 (Dec. 18, 2019), 1-15 No. n18891, XP030225589.

* cited by examiner

*FIG. 6*

| | |
|---|---|
| 1 | OBTAIN CENTROID OF POINTS AND SELECT POINT CLOSE TO CENTROID |
| 2 | SELECT POINT ON BASIS OF DISTRIBUTION PATTERN OF POINTS (SIGNALING OF TABLE) |
| 3 | SIGNAL REFERENCE POINT |
| 4 | ALTERNATELY SELECT POINT CLOSE TO AND POINT FAR FROM CENTER OF BOUNDING BOX |

FIG. 8

| METHOD OF DERIVING CENTROID | | |
|---|---|---|
| (1) | OBTAIN CENTROID OF POINT GROUP OF REFERENCE POINT CANDIDATES | DERIVE CENTROID OF POINT GROUP IN NxNxN (N>=2) |
| (2) | OBTAIN CENTROID OF N POINTS IN VICINITY | SEARCH FOR N POINTS IN VICINITY FROM CENTER COORDINATES OF 2x2x2, AND DERIVE CENTROID |
| (3) | OBTAIN CENTROID OF N POINTS IN VICINITY (MODIFIED) | EXCLUDE POINT GROUP IN 2x2x2 FROM POINTS IN VICINITY OF (2) |
| (4) | OBTAIN CENTROID IN REGION WITH RADIUS r | DERIVE CENTROID OF POINT GROUP IN REGION WITH RADIUS r CENTERED ON CENTER COORDINATES OF 2x2x2 |

*FIG. 11*

| METHOD OF SELECTING REFERENCE POINT FROM PLURALITY OF CANDIDATES (POINTS AT EQUAL DISTANCE FROM CENTROID, POINTS AT DISTANCE THRESHOLD Dth OR LESS, OR THE LIKE) |
| --- |
| (1) SELECT FIRST POINT TO BE PROCESSING TARGET IN PREDETERMINED SEARCH ORDER |
| (2) SELECT FIRST OR LAST POINT TO BE PROCESSING TARGET IN PREDETERMINED SEARCH ORDER |
| (3) SELECT POINT TO BE PROCESSING TARGET IN MIDDLE (NUMBER/2) OF PREDETERMINED SEARCH ORDER |
| (4) SELECT POINT TO BE PROCESSING TARGET IN DESIGNATED ORDER IN PREDETERMINED SEARCH ORDER (Signal DESIGNATED ORDER) |
| (5) DERIVE CENTROID OF WIDER RANGE AND SELECT POINT USING CENTROID |

*FIG. 13*

START OF DE-HIERARCHIZATION PROCESSING

PERFORM HIERARCHIZATION PROCESSING
OF ATTRIBUTE DATA ON BASIS OF GEOMETRY
DATA AND METADATA, RESTORE REFERENCE
POINT OF EACH HIERARCHY,
AND RESTORE REFERENCE RELATIONSHIP    S221

RESTORE ATTRIBUTE DATA OF EACH POINT
ON BASIS OF REFERENCE RELATIONSHIP
OF EACH HIERARCHY    S222

RETURN

*FIG. 25*

| PATTERN | INDEX OF POINT TO BE SELECTED |
|---------|-------------------------------|
| 10100001 | 2 |
| 11****** | 1 |
| *1** | 4 |

*FIG. 26*

| TABLE | |
|---|---|
| (1) | TABLE FOR SELECTING POINT CLOSE TO CENTROID |
| (2) | TABLE FOR SELECTING ARBITRARY POINT |
| (3) | SELECT TABLE TO BE USED FROM PLURALITY OF TABLES |

A

| SIGNALING OF TABLE | |
|---|---|
| (1) | DEFINE BY STANDARD (NO SIGNALING) |
| (2) | SIGNAL INDEX OF TABLE |
| (3) | SIGNAL TABLE |
| (4) | SIGNAL PART OF TABLE |

| | TARGET OF SIGNALING |
|---|---|
| (1) | ALL |
| (2) | LIMIT BY LoD |
| (3) | LIMIT BY NUMBER OF POINTS OF VOXELS OF NxNxN AT LOWER LEVEL |
| (4) | COMBINATION OF (2) AND (3) |

Figure 32:
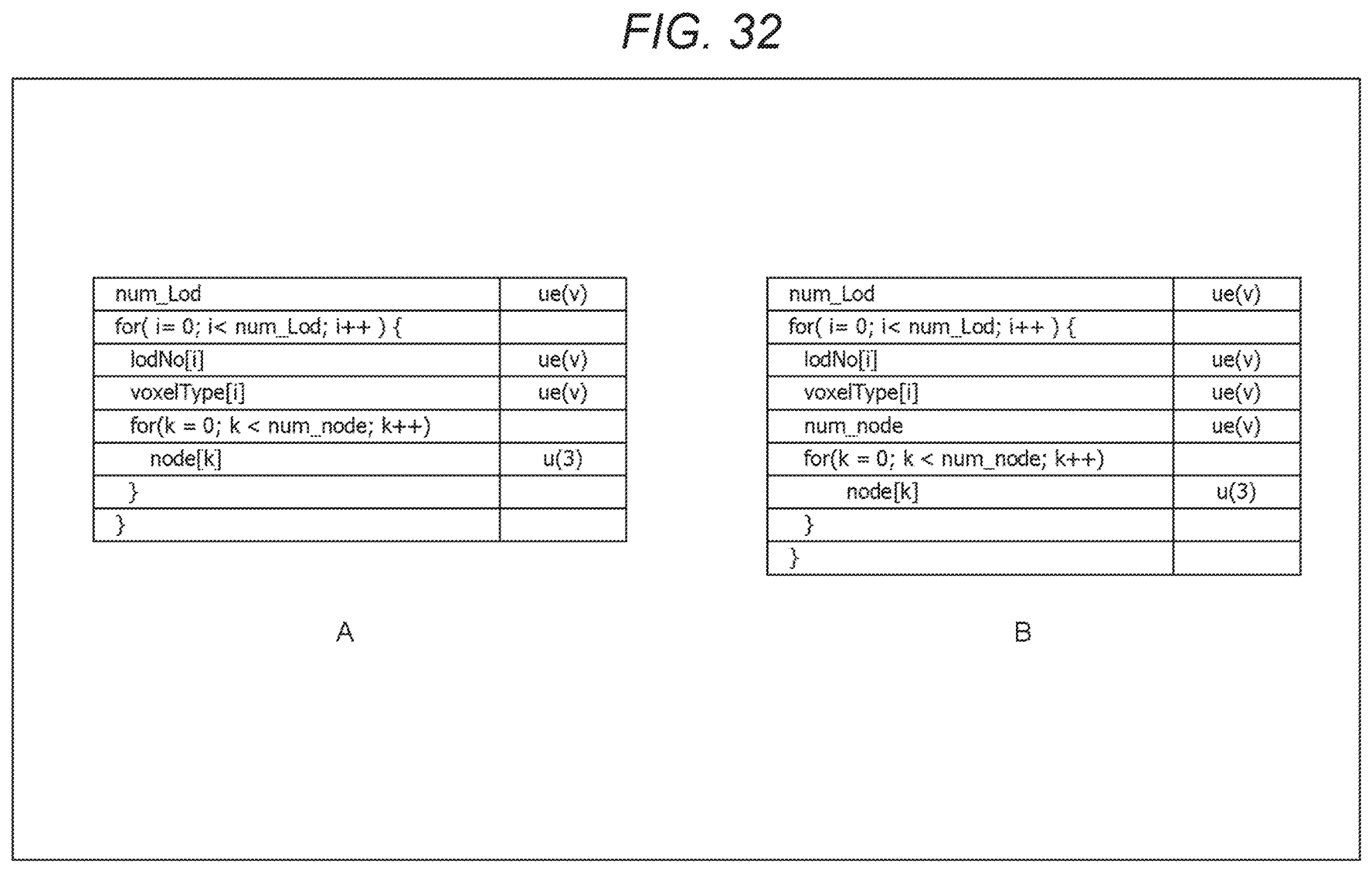

| | |
|---|---|
| num_Lod | ue(v) |
| for( i = 0; i < num_Lod; i++ ) { | |
| lodNo[i] | ue(v) |
| voxelType[i] | ue(v) |
| for(k = 0; k < num_node; k++) | |
| node[k] | u(3) |
| } | |
| } | |

B

| | |
|---|---|
| num_Lod | ue(v) |
| for( i = 0; i < num_Lod; i++ ) { | |
| lodNo[i] | ue(v) |
| voxelType[i] | ue(v) |
| num_node | ue(v) |
| for(k = 0; k < num_node; k++) | |
| node[k] | u(3) |
| } | |
| } | |

Figure 33:
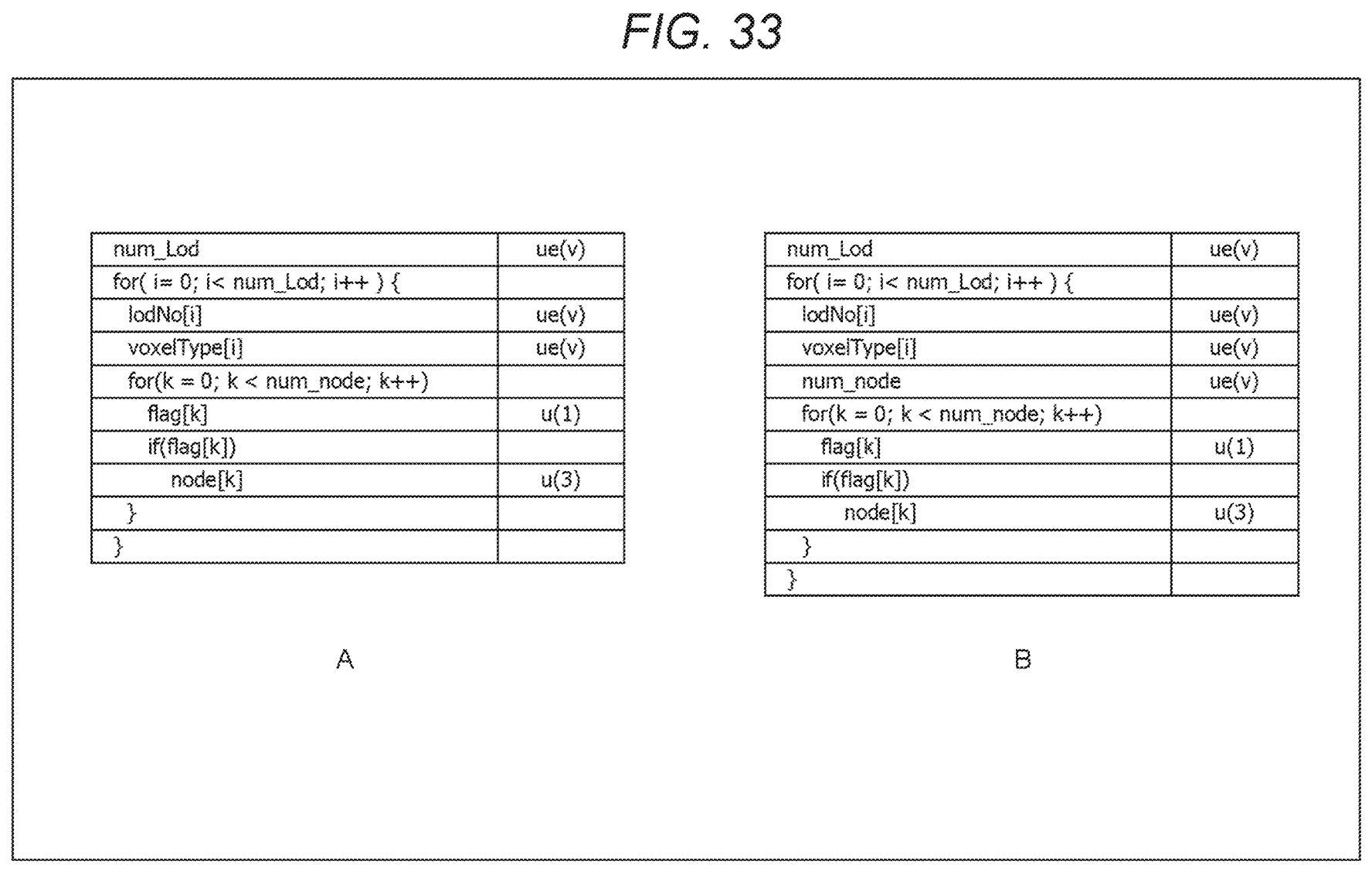

| | |
|---|---|
| num_Lod | ue(v) |
| for( i= 0; i< num_Lod; i++ ) { | |
| lodNo[i] | ue(v) |
| voxelType[i] | ue(v) |
| for(k = 0; k < num_node; k++) | |
| flag[k] | u(1) |
| if(flag[k]) | |
| node[k] | u(3) |
| } | |
| } | |

B

| | |
|---|---|
| num_Lod | ue(v) |
| for( i = 0; i < num_Lod; i++ ) { | |
| lodNo[i] | ue(v) |
| voxelType[i] | ue(v) |
| num_node | ue(v) |
| for(k = 0; k < num_node; k++) | |
| flag[k] | u(1) |
| if(flag[k]) | |
| node[k] | u(3) |
| } | |
| } | |

*FIG. 34*

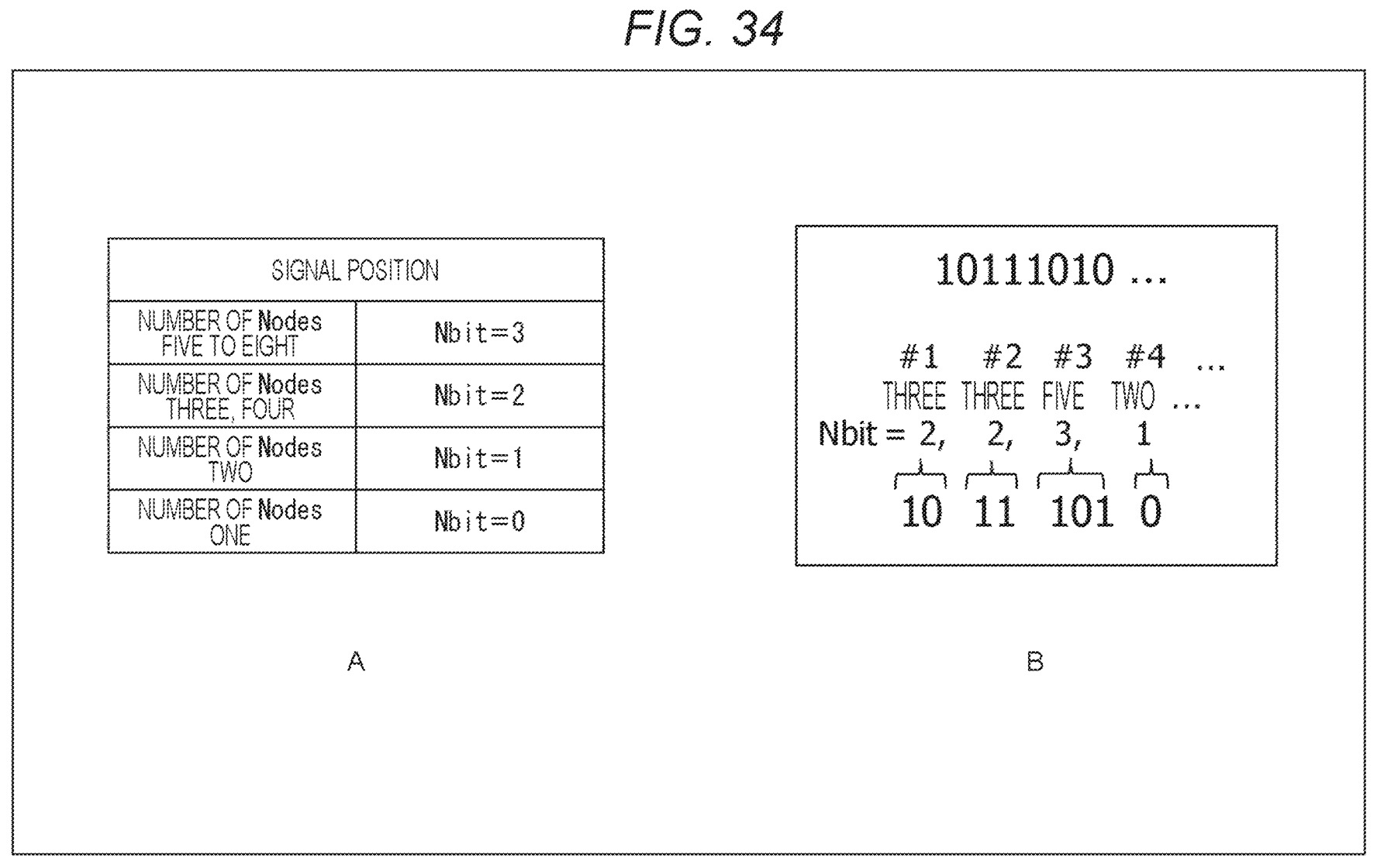

| SIGNAL POSITION | |
|---|---|
| NUMBER OF Nodes FIVE TO EIGHT | Nbit = 3 |
| NUMBER OF Nodes THREE, FOUR | Nbit = 2 |
| NUMBER OF Nodes TWO | Nbit = 1 |
| NUMBER OF Nodes ONE | Nbit = 0 |

A

1011101010 · · ×

1    #2    #3    #4    · · ·
THREE THREE FIVE FIVE TWO TWO · · ·
Nbit = 2,    2,    3,    3,    1
10    11    101    101    0

Figure 35:
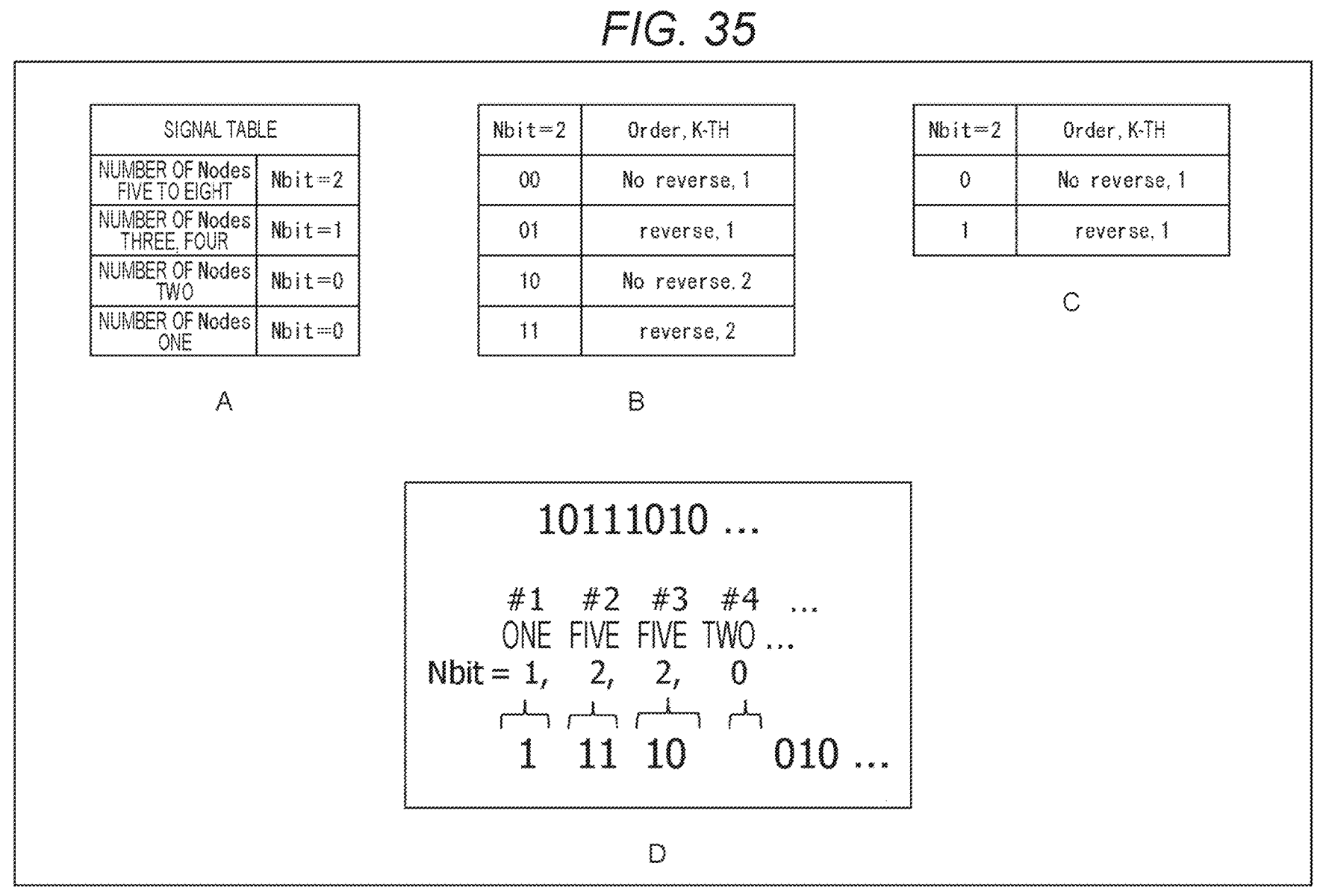

| SIGNAL TABLE | |
|---|---|
| NUMBER OF Nodes FIVE TO EIGHT | Nbit=2 |
| NUMBER OF Nodes THREE, FOUR | Nbit=1 |
| NUMBER OF Nodes TWO | Nbit=0 |
| NUMBER OF Nodes ONE | Nbit=0 |

B

| Nbit=2 | Order, K-TH |
|---|---|
| 00 | No reverse, 1 |
| 01 | reverse, 1 |
| 10 | No reverse, 2 |
| 11 | reverse, 2 |

C

| Nbit=2 | Order, K-TH |
|---|---|
| 0 | No reverse, 1 |
| 1 | reverse, 1 |

D

10111010 ...

```
        #1   #2  #3  #4 ...
        ONE FIVE FIVE TWO ...
Nbit = 1,  2,   2,   0 ...
        ┌─┐ ┌──┐ ┌─┐ ┌─┐
         1   11   10  010 ...
```

*FIG. 36*

| | |
|---|---|
| num_Lod | ue(v) |
| for( i = 0; i < num_Lod; i++ ) { | |
| lodNo[i] | ue(v) |
| voxelType[i] | ue(v) |
| signalType[i] | ue(v) |
| bitLength | ue(v) |
| for(k = 0; k < bitLength; k++) | |
| bit[k] | u(1) |
| } | |
| } | |

*FIG. 37*

| | |
|---|---|
| num_signal_Lod | ue(v) |
| for( i = 0; i< num_signal_Lod; i++ ) { | |
| lodNo[i] | ue(v) |
| type[i] | ue(v) |
| voxelType[i] | ue(v) |
| num_node | ue(v) |
| for( j = 0; j < num_subsampled_node; j++ ) { | |
| flag[j] | u(1) |
| } | |
| signalType[i] | ue(v) |
| bitLength | ue(v) |
| for(k = 0; k < bitLength; k++) | |
| bit[k] | u(1) |
| } | |
| } | |

FIG. 41

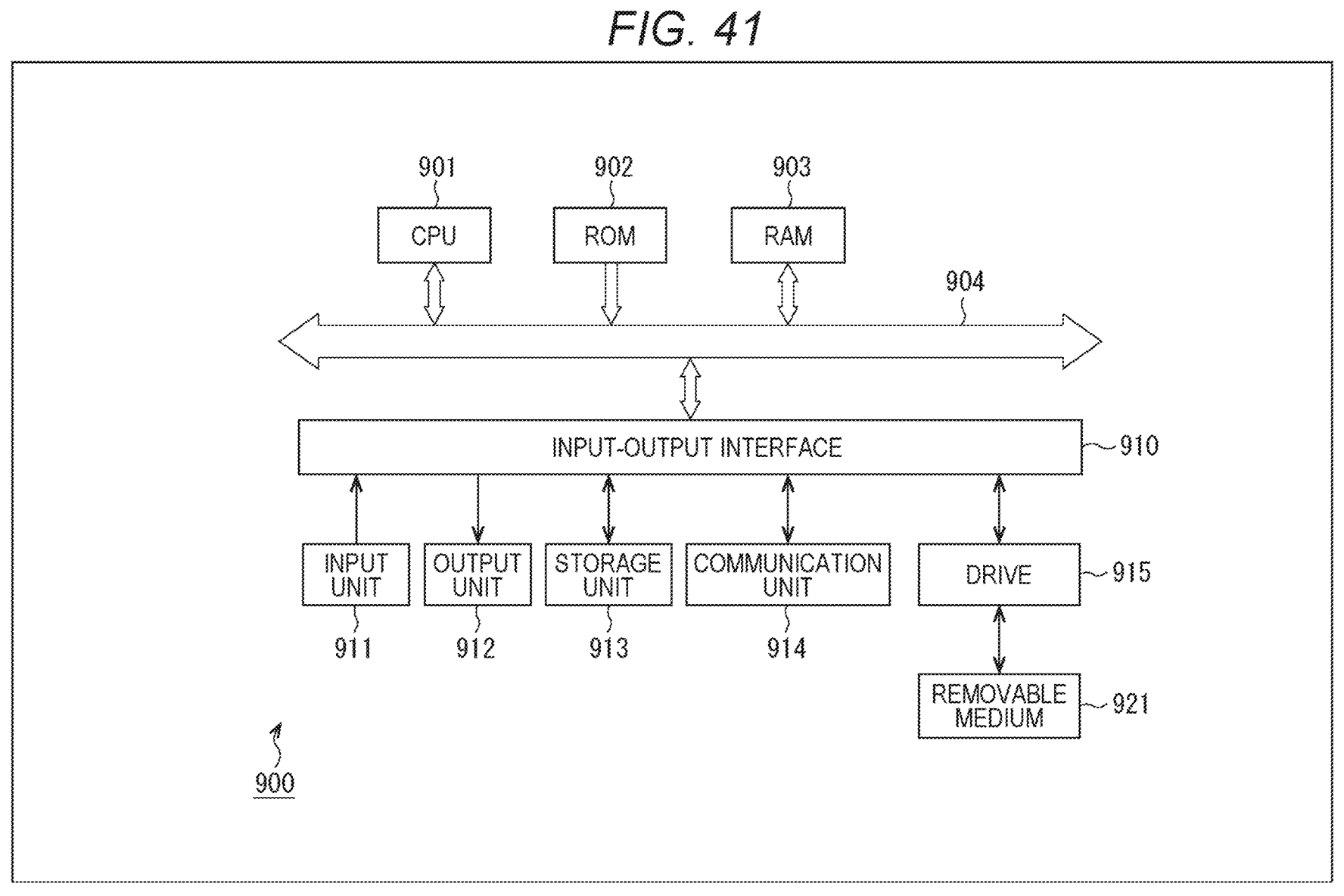

901 CPU

902 ROM

903 RAM

904

910 INPUT-OUTPUT INTERFACE

911 INPUT UNIT

912 OUTPUT UNIT

913 STORAGE UNIT

914 COMMUNICATION UNIT

915 DRIVE

921 REMOVABLE MEDIUM

900

INFORMATION PROCESSING DEVICE AND METHOD

CROSS REFERENCE TO PRIOR APPLICATION

This application is a continuation of U.S. patent application Ser. No. 17/790,393 (filed on Jun. 30, 2022), which is a National Stage Patent Application of PCT International Patent Application No. PCT/JP2020/048358 (filed on Dec. 24, 2020) under 35 U.S.C. § 371, which claims priority to Japanese Patent Application No. 2020-000679 (filed on Jan. 7, 2020), which are all hereby incorporated by reference in their entirety.

TECHNICAL FIELD

The present disclosure relates to an information processing device and method, and more particularly relates to an information processing device and method capable of suppressing a decrease in encoding efficiency.

BACKGROUND ART

Conventionally, for example, a method of encoding 3D data representing a three-dimensional structure such as a point cloud has been considered (for example, see Non-Patent Document 1). Data of the point cloud includes geometry data (also referred to as position information) and attribute data (also referred to as attribute information) of each point. Therefore, the point cloud is encoded for each piece of the geometry data and the attribute data. Various methods have been proposed as methods for encoding the attribute data. For example, it has been proposed to use a technique called lifting (for example, see Non-Patent Document 2). Furthermore, a method for enabling scalable decoding of the attribute data has also been proposed (see, for example, Non-Patent Document 3).

In such a lifting scheme, a process of setting a point as a reference point or a prediction point is repeated recursively with respect to the reference point, to thereby hierarchize the attribute data. Then, according to this hierarchical structure, a predicted value of the attribute data of the prediction point is derived using the attribute data of the reference point, and a difference value between the predicted value and the attribute data is encoded. In such hierarchization of the attribute data, a method of alternately selecting, as the reference point, the first point and the last point in Morton order among candidates for the reference point in each hierarchy has been proposed (see, for example, Non-Patent Document 4).

CITATION LIST

Non-Patent Document

Non-Patent Document 1: R. Mekuria, Student Member IEEE, K. Blom, P. Cesar., Member, IEEE, "Design, Implementation and Evaluation of a Point Cloud Codec for Tele-Immersive Video", tcsvt_paper_submitted_february.pdf Non-Patent Document 2: Khaled Mammou, Alexis Tourapis, Jungsun Kim, Fabrice Robinet, Valery Valentin, Yeping Su, "Lifting Scheme for Lossy Attribute Encoding in TMC1", ISO/IEC JTC1/SC29/WG11 MPEG2018/m42640, April 2018, San Diego, US Non-Patent Document 3: Ohji Nakagami, Satoru Kuma, "[G-PCC] Spatial scalability support for G-PCC", ISO/IEC JTC1/SC29/WG11 MPEG2019/m47352, March 2019, Geneva, CH Non-Patent Document 4: Hyejung Hur, Sejin Oh, "[G-PCC] [New Proposal] on improved spatial scalable lifting", ISO/IEC JTC1/SC29/WG11 MPEG2019/M51408, October 2019, Geneva, CH

SUMMARY OF THE INVENTION

Problems to be Solved by the Invention

However, the method described in Non-Patent Document 4 is not always optimal, and other methods are also required.

The present disclosure has been made in view of such a situation, and makes it possible to suppress a decrease in encoding efficiency.

Solutions to Problems

An information processing device according to one aspect of the present technology is an information processing device including a hierarchization unit that, for attribute information of each point of a point cloud that represents an object having a three-dimensional shape as a set of points, hierarchizes the attribute information by recursively repeating classification of a prediction point for deriving a difference value between the attribute information and a predicted value of the attribute information and a reference point used for deriving the predicted value with respect to the reference point, in which the hierarchization unit sets the reference point on the basis of a centroid of points.

An information processing method according to one aspect of the present technology is an information processing method including, when performing, for attribute information of each point of a point cloud that represents an object having a three-dimensional shape as a set of points, hierarchization of the attribute information by recursively repeating classification of a prediction point for deriving a difference value between the attribute information and a predicted value of the attribute information and a reference point used for deriving the predicted value with respect to the reference point, setting the reference point on the basis of a centroid of points.

An information processing device according to another aspect of the present technology is an information processing device including a hierarchization unit that, for attribute information of each point of a point cloud that represents an object having a three-dimensional shape as a set of points, hierarchizes the attribute information by recursively repeating classification of a prediction point for deriving a difference value between the attribute information and a predicted value of the attribute information and a reference point used for deriving the predicted value with respect to the reference point, in which the hierarchization unit sets the reference point on the basis of a distribution mode of points.

An information processing method according to another aspect of the present technology is an information processing method including, when performing, for attribute information of each point of a point cloud that represents an object having a three-dimensional shape as a set of points, hierarchization of the attribute information by recursively repeating classification of a prediction point for deriving a difference value between the attribute information and a predicted value of the attribute information and a reference point used for deriving the predicted value with respect to the reference point, setting the reference point on the basis of a distribution mode of points.

An information processing device according to still another aspect of the present technology is an information processing device including a hierarchization unit that, for attribute information of each point of a point cloud that represents an object having a three-dimensional shape as a set of points, hierarchizes the attribute information by recursively repeating classification of a prediction point for deriving a difference value between the attribute information and a predicted value of the attribute information and a reference point used for deriving the predicted value with respect to the reference point, and an encoding unit that encodes information regarding setting of the reference point by the hierarchization unit.

An information processing method according to still another aspect of the present technology is an information processing method including hierarchizing, for attribute information of each point of a point cloud that represents an object having a three-dimensional shape as a set of points, the attribute information by recursively repeating classification of a prediction point for deriving a difference value between the attribute information and a predicted value of the attribute information and a reference point used for deriving the predicted value with respect to the reference point, and encoding information regarding setting of the reference point.

An information processing device according to still another aspect of the present technology is an information processing device including a hierarchization unit that, for attribute information of each point of a point cloud that represents an object having a three-dimensional shape as a set of points, hierarchizes the attribute information by recursively repeating classification of a prediction point for deriving a difference value between the attribute information and a predicted value of the attribute information and a reference point used for deriving the predicted value with respect to the reference point, in which the hierarchization unit alternately selects, as the reference point, a point closer to a center of a bounding box and a point farther from the center of the bounding box among candidates for the reference point for each hierarchy.

An information processing method according to still another aspect of the present technology is an information processing method including when performing, for attribute information of each point of a point cloud that represents an object having a three-dimensional shape as a set of points, hierarchization of the attribute information by recursively repeating classification of a prediction point for deriving a difference value between the attribute information and a predicted value of the attribute information and a reference point used for deriving the predicted value with respect to the reference point, alternately selecting, as the reference point, a point closer to a center of a bounding box and a point farther from the center of the bounding box among candidates for the reference point for each hierarchy.

In the information processing device and method according to one aspect of the present technology, when performing, for attribute information of each point of a point cloud that represents an object having a three-dimensional shape as a set of points, hierarchization of the attribute information by recursively repeating classification of a prediction point for deriving a difference value between the attribute information and a predicted value of the attribute information and a reference point used for deriving the predicted value with respect to the reference point, the reference point is set on the basis of a centroid of points.

In the information processing device and method according to another aspect of the present technology, when performing, for attribute information of each point of a point cloud that represents an object having a three-dimensional shape as a set of points, hierarchization of the attribute information by recursively repeating classification of a prediction point for deriving a difference value between the attribute information and a predicted value of the attribute information and a reference point used for deriving the predicted value with respect to the reference point, the reference point is set on the basis of a distribution mode of points.

In the information processing device and method according to still another aspect of the present technology, for attribute information of each point of a point cloud that represents an object having a three-dimensional shape as a set of points, the attribute information is hierarchized by recursively repeating classification of a prediction point for deriving a difference value between the attribute information and a predicted value of the attribute information and a reference point used for deriving the predicted value with respect to the reference point, and information regarding setting of the reference point is encoded.

In the information processing device and method according to still another aspect of the present technology, when performing, for attribute information of each point of a point cloud that represents an object having a three-dimensional shape as a set of points, hierarchization of the attribute information by recursively repeating classification of a prediction point for deriving a difference value between the attribute information and a predicted value of the attribute information and a reference point used for deriving the predicted value with respect to the reference point, as the reference point, a point closer to a center of a bounding box and a point farther from the center of the bounding box among candidates for the reference point for each hierarchy are alternately selected.

BRIEF DESCRIPTION OF DRAWINGS

FIG. 6 is a diagram describing an example of the reference point setting method.

FIG. 8 is a diagram describing an example of a method of deriving the centroid.

FIG. 11 is a diagram describing an example of a method of selecting a point.

FIG. 13 is a block diagram illustrating a main configuration example of an encoding device.

FIG. 25 is a diagram illustrating an example of a table.

FIG. 26 is a diagram describing an example of a table and signaling.

FIG. 28 is a diagram illustrating an example of information to be signaled.

FIG. 32 is a diagram illustrating an example of syntax in a case of signaling information of a fixed-length bit.

FIG. 33 is a diagram illustrating an example of syntax in a case of signaling information of a fixed-length bit.

FIG. 34 is a diagram illustrating an example of information of variable length bits to be signaled.

FIG. 35 is a diagram illustrating an example of information of variable length bits to be signaled.

FIG. 36 is a diagram illustrating an example of syntax in a case of signaling information of variable length bits.

FIG. 37 is a diagram illustrating an example of syntax in a case of signaling information of variable length bits.

FIG. 41 is a block diagram illustrating a main configuration example of a computer.

MODE FOR CARRYING OUT THE INVENTION

Figure 1:
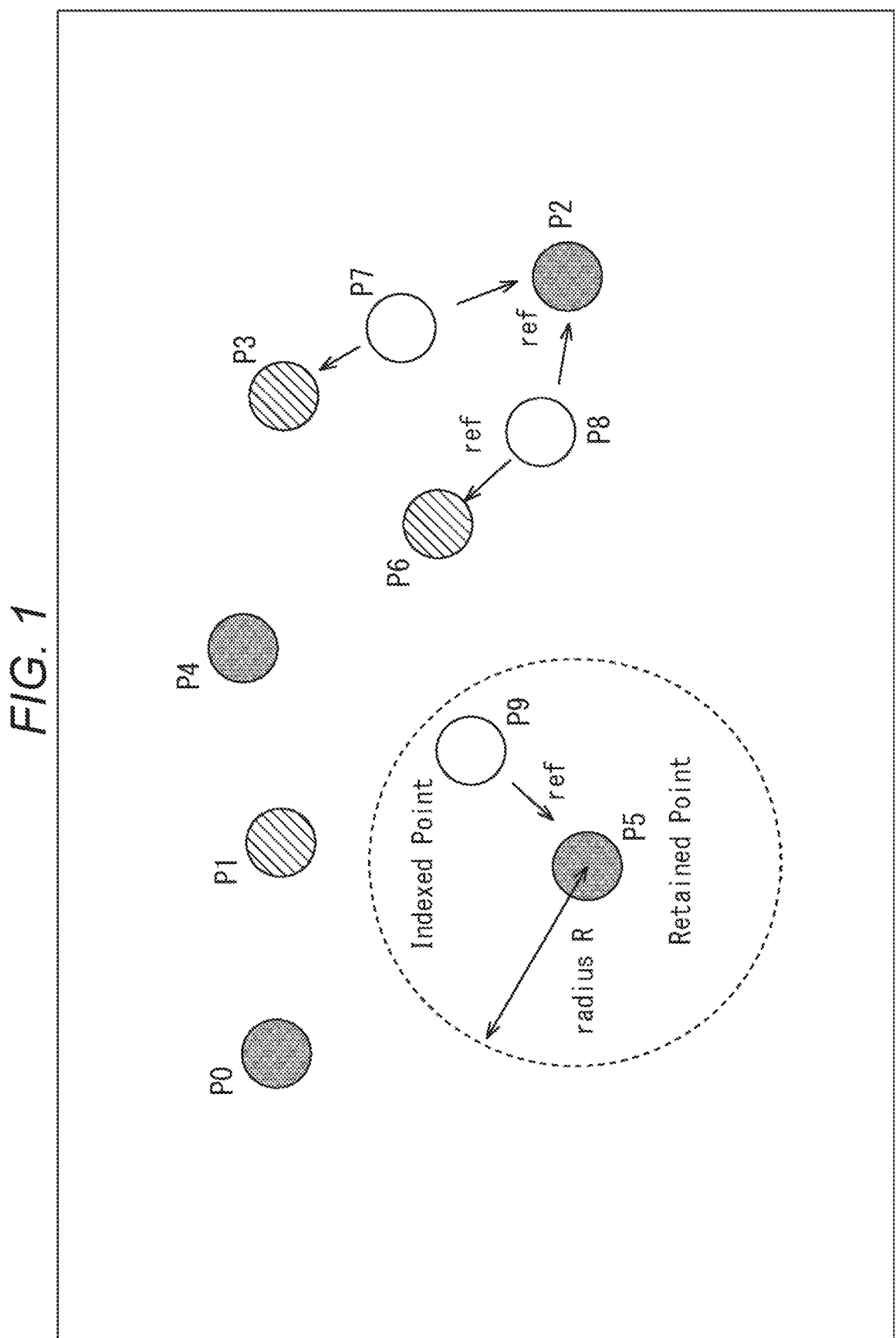
FIG. 1 is a diagram describing an example of a state of lifting.

Hereinafter, modes for carrying out the present disclosure (hereinafter referred to as embodiments) will be described. Note that the description will be made in the following order.

1. Setting of Reference Point
2. First Embodiment (Method 1)
3. Second Embodiment (Method 2)

4. Third Embodiment (Method 3)
5. Fourth Embodiment (Method 4)
6. Appendix

1. SETTING OF REFERENCE POINT

<Documents and the Like That Support Technical Contents and Terms>

The scope disclosed in the present technology includes not only the contents described in the embodiments but also the contents described in the following non-patent documents known at the time of filing.

Non-Patent Document 1: (described above)
Non-Patent Document 2: (described above)
Non-Patent Document 3: (described above)
Non-Patent Document 4: (described above)

That is, the contents described in the above-described non-patent documents, the contents of other documents referred to in the above-described non-patent documents, and the like are also grounds for determining the support requirement.

<Point Cloud>

Conventionally, there has been 3D data such as a point cloud representing a three-dimensional structure by position information, attribute information, and the like of points, and a mesh that is configured by vertices, edges, and surfaces and defines a three-dimensional shape using polygonal representation.

For example, in a case of the point cloud, a three-dimensional structure (three-dimensional object) is expressed as a set of a large number of points. Data of the point cloud (also referred to as point cloud data) includes position information (also referred to as geometry data) and attribute information (also referred to as attribute data) of each point. The attribute data can include any information. For example, color information, reflectance information, normal line information, and the like of each point may be included in the attribute data. As described above, the point cloud data has a relatively simple data structure, and can express any three-dimensional structure with sufficient accuracy by using a sufficiently large number of points.

<Quantization of Position Information Using Voxels>

Since such point cloud data has a relatively large data amount, an encoding method using voxels has been conceived in order to compress the data amount by encoding or the like. The voxel is a three-dimensional region for quantizing geometry data (position information).

That is, a three-dimensional region (also referred to as a bounding box) including the point cloud is divided into small three-dimensional regions called voxels, and whether or not a point is included is indicated for each of the voxels. In this manner, the position of each point is quantized in voxel units. Therefore, by converting point cloud data into such data of voxels (also referred to as voxel data), an increase in the amount of information can be suppressed (typically, the amount of information can be reduced).

<Octree>

Moreover, it has been conceived to construct an Octree using such voxel data for the geometry data. The Octree is obtained by converting the voxel data into a tree structure. The value of each bit of the lowest node in the Octree indicates the presence or absence of a point in each voxel. For example, a value "1" indicates a voxel containing a point, and a value "0" indicates a voxel not containing a point. In the Octree, one node corresponds to eight voxels. That is, each node of the Octree includes 8-bit data, and the 8-bit data indicates the presence or absence of points in eight voxels.

Then, a higher node of the Octree indicates the presence or absence of a point in a region in which the eight voxels corresponding to a lower node belonging to the node are combined into one. That is, the higher node is generated by collecting information of the voxels of the lower nodes. Note that in a case where a node having a value of "0", that is, all the corresponding eight voxels do not include a point, the node is deleted.

In this manner, a tree structure (Octree) including nodes having values other than "0" is constructed. That is, the Octree can indicate the presence or absence of a point in a voxel at each resolution. By performing Octree conversion and encoding, the position information is decoded from the highest resolution (highest hierarchy) to a desired hierarchy (resolution), so that the point cloud data with that resolution can be restored. That is, information of unnecessary hierarchy (resolutions) can be easily decoded at an arbitrary resolution without being decoded. In other words, scalability of voxels (resolution) can be achieved.

Furthermore, as described above, by omitting the node having the value "0", the resolution of the voxels in the region where the point does not exist can be reduced, so that it is possible to further suppress the increase in the information amount (typically, reduction in the amount of information).

<Lifting>

On the other hand, when the attribute data (attribute information) is encoded, it is assumed that the geometry data (position information) including degradation due to encoding is known, and encoding is performed using a positional relationship between points. As a method of encoding such attribute data, a method using region adaptive hierarchical transform (RAHT) or a transform called lifting as described in Non-Patent Document 2 has been considered. By applying these techniques, the attribute data can be hierarchized like the Octree for geometry data.

For example, in a case of the lifting described in Non-Patent Document 2, the attribute data is hierarchized by recursively repeating a process of setting a point as a reference point or a prediction point with respect to the reference point. Then, according to this hierarchical structure, a predicted value of the attribute data of the prediction point is derived using the attribute data of the reference point, and a difference value between the predicted value and the attribute data is encoded.

For example, it is assumed that a point P5 is selected as the reference point in FIG. 1. In this case, for the prediction point, a search is performed in a circular region with a radius R centered on the point P5. In this case, since a point P9 is located in the region, the point P9 is set as the prediction point (the prediction point using the point P5 as the reference point) from which a predicted value is derived with reference to the point P5.

By such processing, for example, respective difference values of a point P7 to the point P9 indicated by white circles, respective difference values of a point P1, a point P3, and a point P6 indicated by diagonal lines, and respective difference values of a point P0, a point P2, a point P4, and the point P5 indicated by gray circles are derived as difference values of different hierarchies.

Note that while the point cloud is arranged in a three-dimensional space and the above-described processing is performed in the three-dimensional space in practice, in FIG. 1, the three-dimensional space is schematically illustrated using a two-dimensional plane for convenience of description. That is, the description made with reference to FIG. 1 can be similarly applied to a process, a phenomenon, or the like in a three-dimensional space.

In the following description, the three-dimensional space is appropriately described using a two-dimensional plane. Unless otherwise specified, basically, the description can be similarly applied to a process, a phenomenon, or the like in the three-dimensional space.

Figure 2:
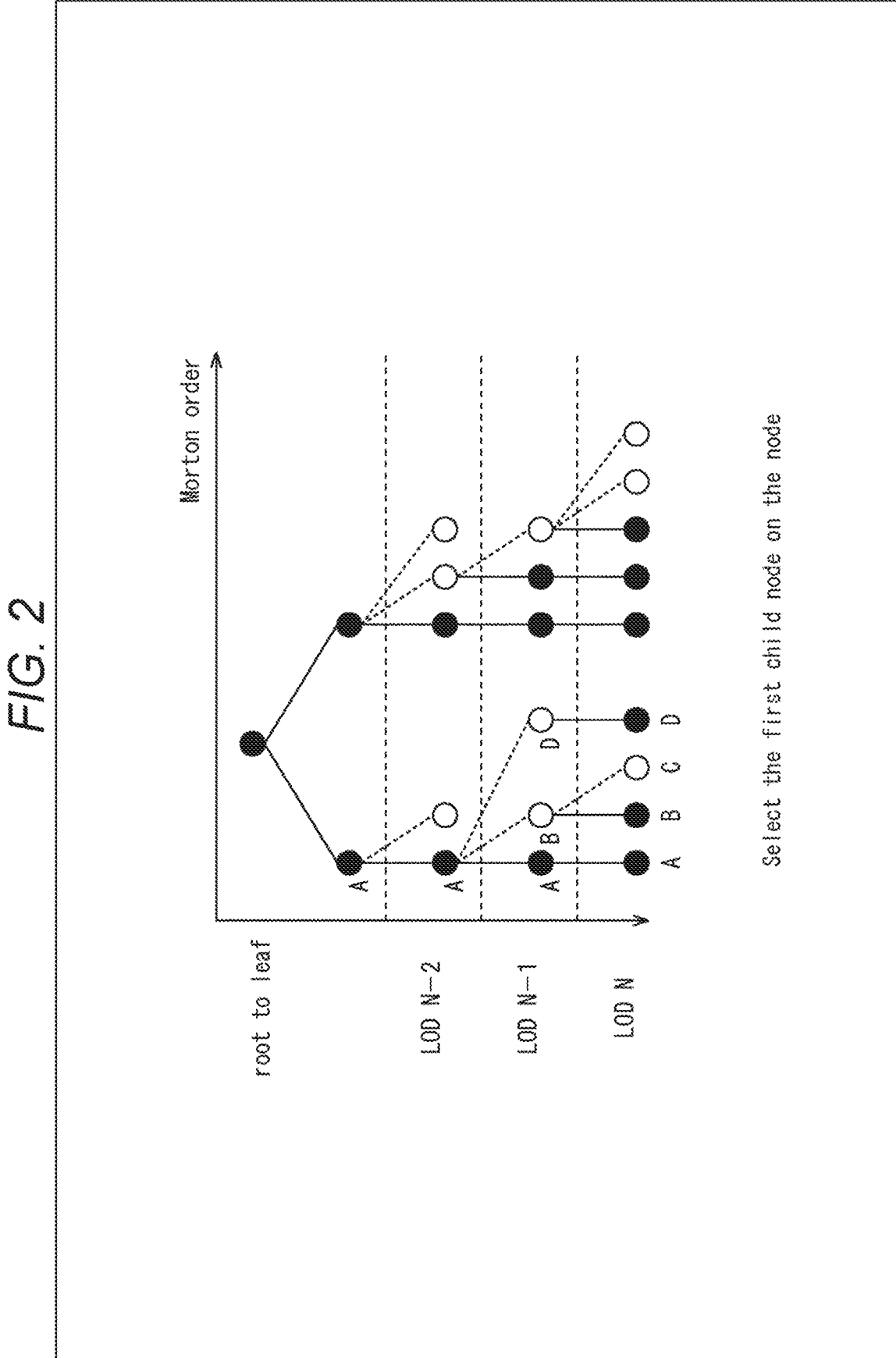
FIG. 2 is a diagram describing an example of a method of setting a reference point based on Morton order.

The selection of the reference point in this hierarchization has been performed, for example, according to Morton order. For example, as in the tree structure illustrated in FIG. 2, in a case where one reference point is selected from a plurality of nodes in a certain hierarchy and the selected reference point is set as a node that is one level higher, a search for the plurality of nodes is performed in the Morton order, and a node that appears first is selected as the reference point. In FIG. 2, each circle represents a node, and a black circle represents a node selected as the reference point (that is, the node is selected as the node that is one level higher). In FIG. 2, respective nodes are sorted in the Morton order from left to right. That is, in a case of the example of FIG. 2, the leftmost node is always selected.

Figure 3:
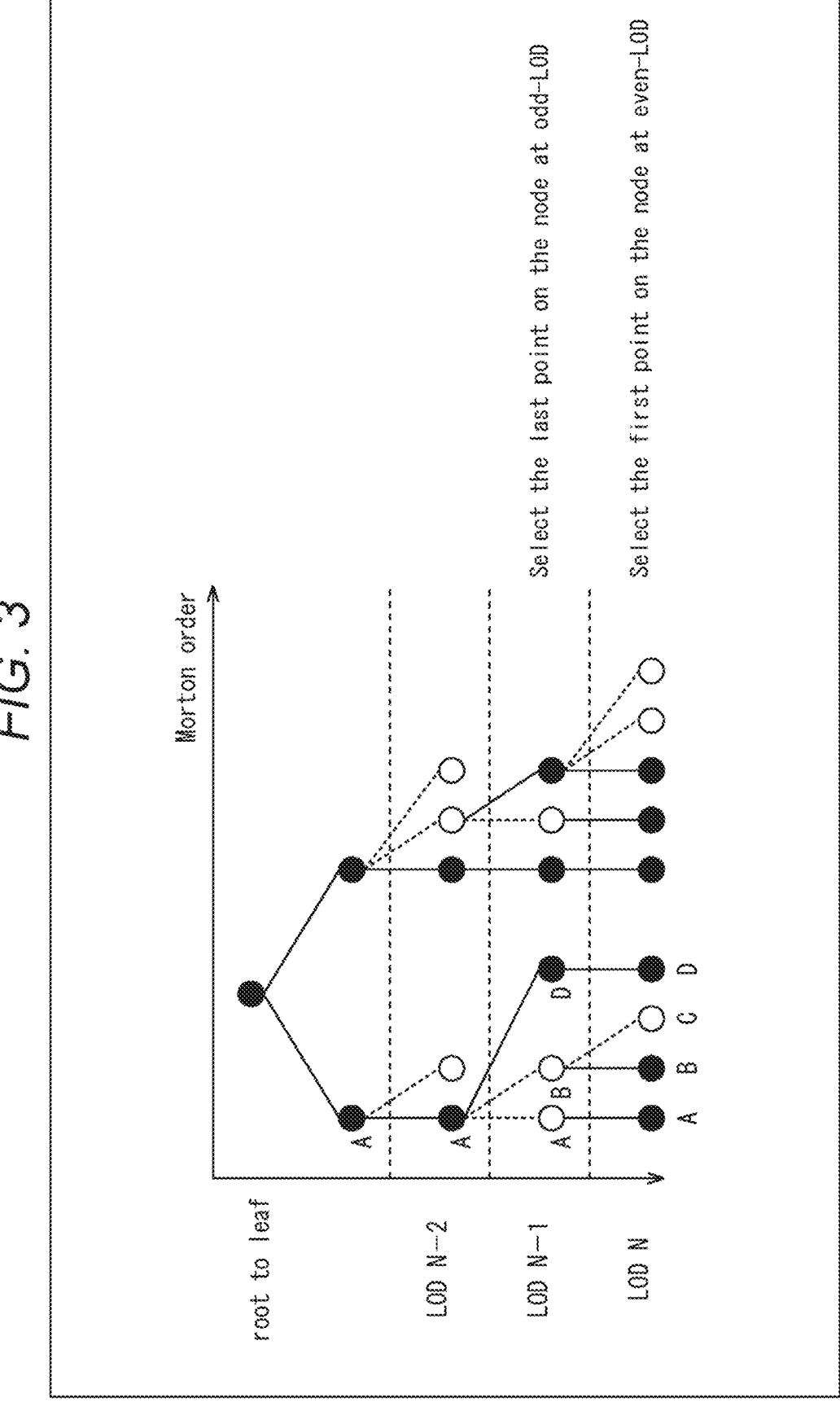
FIG. 3 is a diagram describing an example of the method of setting the reference point based on the Morton order.

On the other hand, in such hierarchization of the attribute data, Non-Patent Document 4 proposes a method of alternately selecting, as the reference point, the first point and the last point in the Morton order among candidates for the reference point for each hierarchy. That is, as in an example of FIG. 3, in the hierarchy of LoD N, the first node in the Morton order is selected as the reference point, and in the next hierarchy (LoD N−1), the last node in the Morton order is selected as the reference point.

Figure 4:
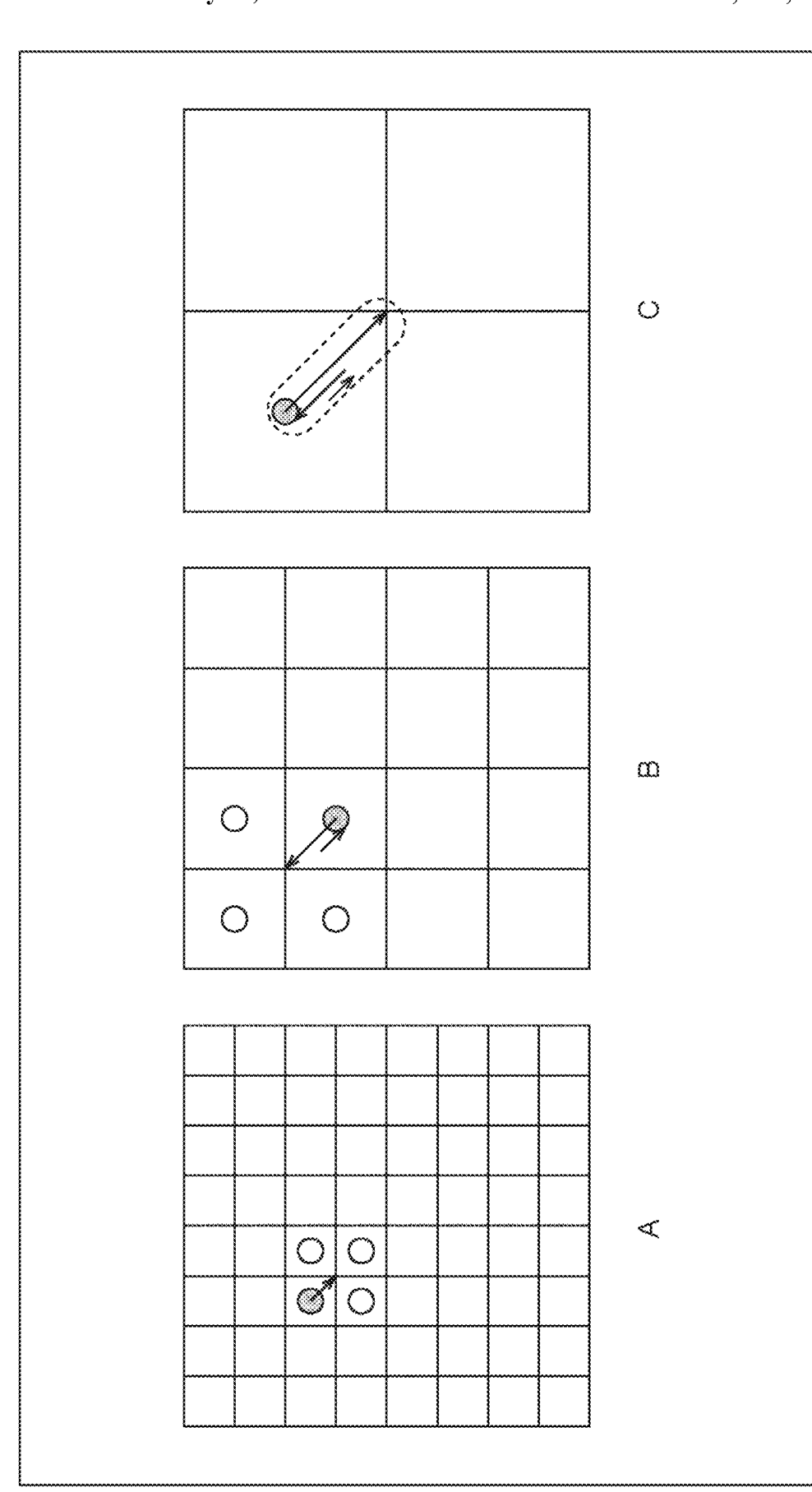
FIG. 4 is a diagram describing an example of the method of setting the reference point based on the Morton order.

FIG. 4 illustrates an example of how the reference point is selected in a three-dimensional space using a two-dimensional plane. Each square in A of FIG. 4 indicates a voxel in a certain hierarchy. Furthermore, a circle indicates a candidate of a reference point as a processing target. In a case where the reference point is selected from the 2×2 points illustrated in A of FIG. 4, for example, the first point (gray point) of the Morton order is selected as the reference point. In the hierarchy that is one level higher, as illustrated in B of FIG. 4, the last point (gray point) in the Morton order among the 2×2 points is selected as the reference point. Moreover, in the hierarchy that is one level higher, as illustrated in C of FIG. 4, the first point (gray point) in the Morton order among the 2×2 points is selected as the reference point.

Respective arrows illustrated in A to C of FIG. 4 indicate movement of the reference point. In this case, the movement range of the reference point is limited to a narrow range as indicated by a dotted line frame illustrated in C of FIG. 4, and thus a decrease in prediction accuracy is suppressed.

Figure 5:
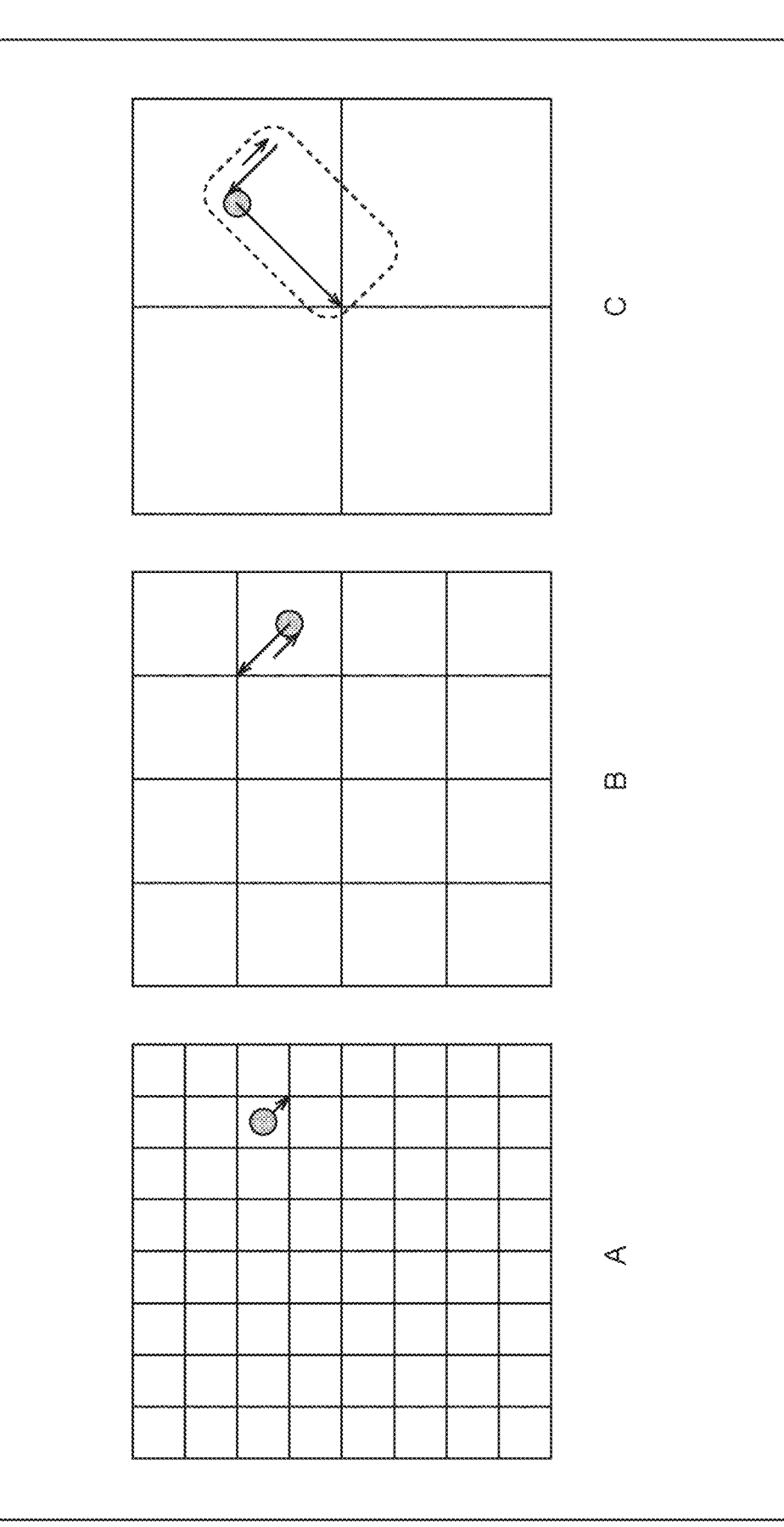
FIG. 5 is a diagram describing an example of the method of setting the reference point based on the Morton order.

However, when the reference point is selected at a position illustrated in FIG. 5 as in a case of FIG. 4, the position of the reference point moves as in A to C of FIG. 5. FIG. 4 illustrates another example of how the reference point is selected in the three-dimensional space using the two-dimensional plane. That is, the movement range of the reference point is wider than that in the case of FIG. 4 as indicated by a dotted line frame illustrated in C of FIG. 5, and the prediction accuracy may decrease.

As described above, in the method described in Non-Patent Document 4, prediction accuracy decreases depending on the position of the point, and encoding efficiency may decrease.

<Method of Setting Reference Point>

Accordingly, for example, as in Method 1 illustrated in the top row of a table of FIG. 6, in the hierarchization of the attribute data, a centroid of points may be obtained, and a reference point may be set on the basis of the centroid. For example, a point close to the derived centroid may be selected as the reference point.

Furthermore, for example, as in Method 2 illustrated in the second row from the top of the table in FIG. 6, in the hierarchization of the attribute data, the reference point may be selected according to a distribution pattern (distribution mode) of points.

Moreover, for example, as in Method 3 illustrated in the third row from the top of the table in FIG. 6, in the hierarchization of the attribute data, information regarding the setting of the reference point may be transmitted from the encoding side to the decoding side.

Furthermore, for example, as in Method 4 illustrated in the fourth row from the top of the table in FIG. 6, in the hierarchization of the attribute data, a point close to and a point far from the center of a bounding box may be alternately selected for each hierarchy as the reference point.

By applying any of these methods, a decrease in encoding efficiency can be suppressed. Note that the above-described methods can be applied in any combination. Furthermore, each of the above-described methods can be applied to encoding or decoding of the attribute data compatible with scalable decoding, and can also be applied to encoding or decoding of the attribute data not compatible with scalable decoding.

2. FIRST EMBODIMENT

<Method 1>

A case where the above-described "Method 1" is applied will be described. In the case of "Method 1", the centroid of points is derived, and the reference point is selected on the basis of the centroid. Any point may be set as the reference point with respect to the derived centroid. For example, a point close to the derived centroid (for example, a point located closer to the centroid) may be selected as the reference point.

Figure 7:
FIG. 7 is a diagram describing an example of the method of setting the reference point based on a centroid.

A of FIG. 7 illustrates an example of a target region in which the reference point is set. In A of FIG. 7, a square indicates a voxel, and a circle indicates a point. That is, A of FIG. 7 is a diagram schematically illustrating an example of a voxel structure in a three-dimensional space using a two-dimensional plane. For example, when points A to C arranged as illustrated in A of FIG. 7 are assumed as candidates for the reference point, the point B close to the centroid of these candidates may be selected as the reference point as illustrated in B of FIG. 7. B of FIG. 7 illustrates a hierarchical structure of the attribute data similarly to FIG. 2 and the like, and a black circle indicates the reference point. That is, the point B is selected as the reference point from the points A to C.

By referring to a point close to the centroid in this manner, a point close to more other points can be set as the reference point. Therefore, in short, the reference point can be set so as to suppress a decrease in prediction accuracy for more prediction points, and a decrease in encoding efficiency can be suppressed.

<Method of Deriving Centroid>

A method of deriving the centroid is arbitrary. For example, the centroid for any point may be applied as the centroid used to select the reference point. For example, a centroid of points located within a predetermined range may be derived, and the centroid may be used to select the reference point. In this manner, it is possible to suppress an increase in the number of points used for deriving the centroid, and it is possible to suppress an increase in load.

Figure 9:
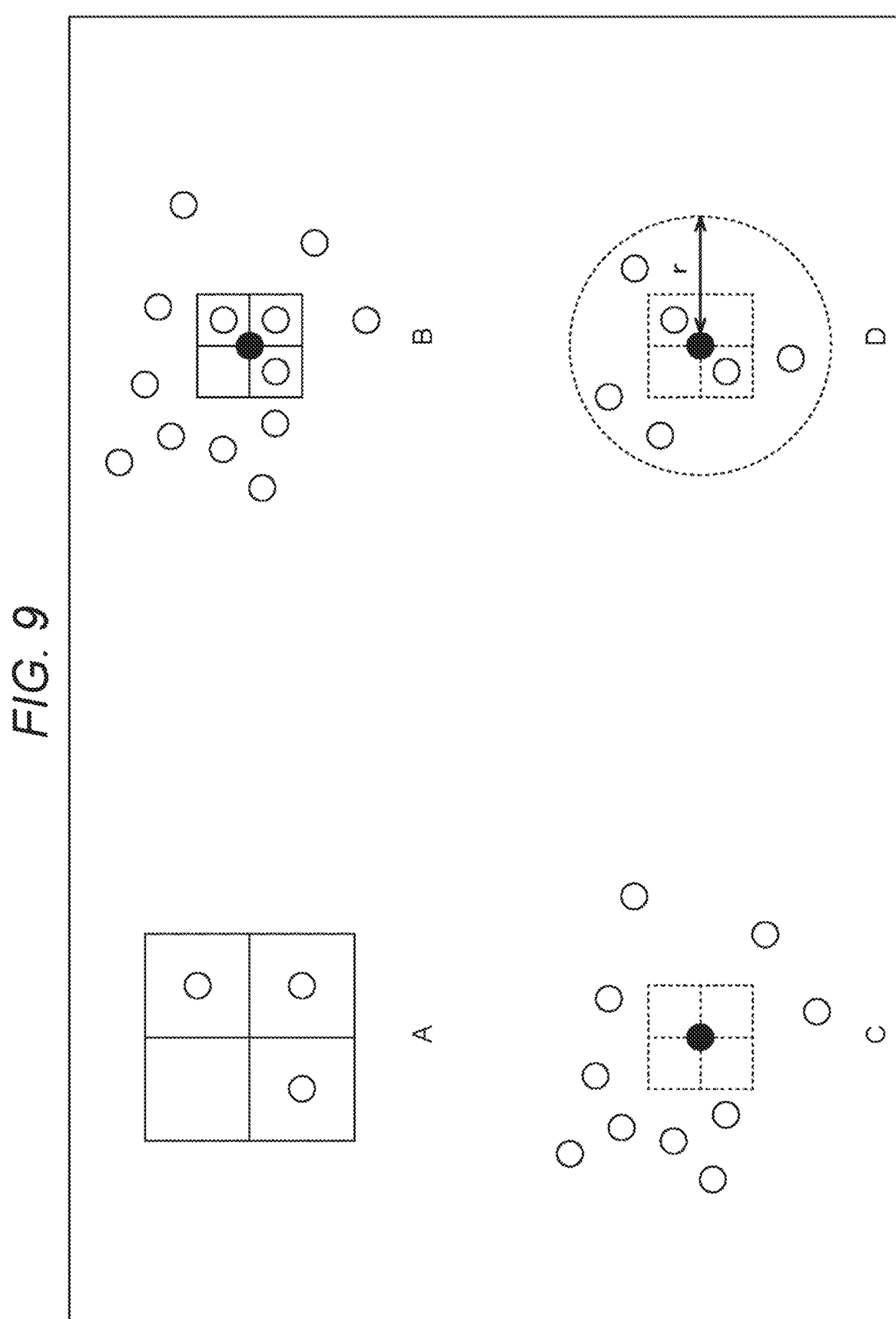
FIG. 9 is a diagram describing an example of the method of deriving the centroid.

The range of points used to derive the centroid (also referred to as a centroid derivation target range) may be any range. For example, the centroid of candidates for the reference point may be derived as in Method (1) illustrated in the second row from the top of a table of the "method of deriving the centroid" illustrated in FIG. 8. That is, for example, as illustrated in A of FIG. 9, a voxel region including 2×2×2 voxels in which a point to be a candidate for the reference point exists may be set as the centroid derivation target range. In A of FIG. 9, a 2×2×2 voxel region in a three-dimensional space is schematically illustrated on a two-dimensional plane (as a 2×2 square). In this case, the centroid of three points indicated by circles in A of FIG. 9 is derived, and the centroid is used for setting the reference point.

In this manner, since it is sufficient to derive the centroid of points (reference point candidates) as a processing target, a search for other points or the like is unnecessary, and the centroid can be easily derived.

Note that the voxel region to be set as the centroid derivation target range is arbitrary and is not limited to 2×2×2. For example, a centroid of points located in a voxel region formed by N×N×N (N>=2) voxels may be derived. That is, the voxel region of N×N×N may be set as the centroid derivation target range.

Figure 10:
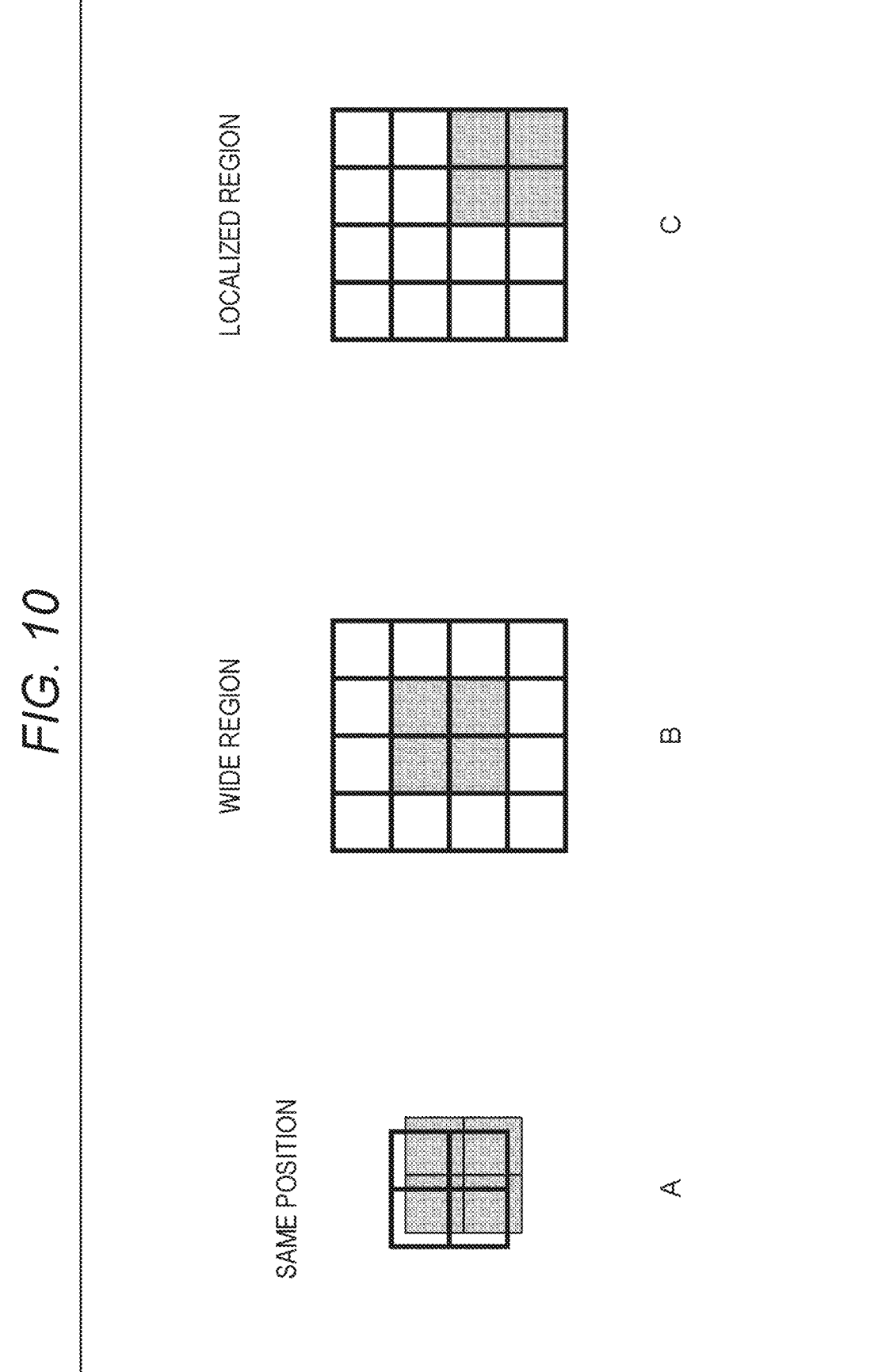
FIG. 10 is a diagram illustrating an example of a region from which the centroid is to be derived.

For example, as illustrated in A of FIG. 10, a voxel region (a voxel region indicated by a thick line in A of FIG. 10) to be set as the centroid derivation target range and a voxel region (a voxel region indicated in gray in A of FIG. 10) as the target from which the reference point is derived may be at the same position (both ranges may be perfectly matched). Note that, in FIG. 10, a voxel region actually configured in the three-dimensional space is schematically illustrated on the two-dimensional plane. Furthermore, in A of FIG. 10, for convenience of description, the centroid derivation target range and the voxel region as the target from which the reference point is derived are illustrated as slightly shifted from each other, but are illustrated so that both the ranges perfectly matched in practice.

Furthermore, for example, as illustrated in B of FIG. 10, a voxel region (a voxel region indicated by a thick line in B of FIG. 10) to be set as the centroid derivation target range may be wider than a voxel region (a voxel region indicated in gray in B of FIG. 10) as the target from which the reference point is derived. In the example in B of FIG. 10, a voxel region of 4×4×4 is set as the centroid derivation target range.

Furthermore, for example, as illustrated in C of FIG. 10, the center of a voxel region (a voxel region indicated by a thick line in C of FIG. 10) to be set as the centroid derivation target range may not coincide with the center of a voxel region (a voxel region indicated in gray in C of FIG. 10) as the target from which the reference point is derived. That is, the centroid derivation target range may extend unevenly in a predetermined direction with respect to the voxel region as the target from which the reference point is derived. For example, in the vicinity of the end of the bounding box or the like, in order to prevent the centroid derivation target range from protruding from the bounding box, the spread of the centroid derivation target range may be biased in this manner.

Furthermore, for example, as in Method (2) illustrated in the third row from the top of the table of the "method of deriving the centroid" illustrated in FIG. 8, the centroid of the N points in the vicinity may be obtained. That is, for example, as illustrated in B of FIG. 9, N points may be searched from a side closer to center coordinates of a voxel region including 2×2×2 voxels in which a point to be a candidate for the reference point exists, and the centroid of the N points may be derived. In B of FIG. 9, a distribution of points actually arranged in a three-dimensional space is schematically illustrated on the two-dimensional plane. Furthermore, a black circle indicates center coordinates of the voxel region as the target from which the reference point is derived. That is, N points (white circles) are selected in order from a side closer to the black circle, and the centroid thereof is derived.

In this manner, the number of points to be searched can be limited to N, and thus an increase in load due to the search can be suppressed.

Furthermore, for example, as in Method (3) illustrated in the fourth row from the top of the table of the "method of deriving the centroid" illustrated in FIG. 8, candidates for a reference point (a point existing in a voxel region including 2×2×2 voxels) may be excluded from the N points in the vicinity derived by Method (2). That is, as illustrated in C of FIG. 9, the voxel region of 2×2×2 may be excluded from the centroid derivation target range, and the centroid of points located outside the voxel region of 2×2×2 may be derived. In C of FIG. 9, a distribution of points actually arranged in a three-dimensional space is schematically illustrated on the two-dimensional plane.

Moreover, for example, as in Method (4) illustrated in fifth row from the top of the table of the "method of deriving the centroid" illustrated in FIG. 8, the centroid of points in a region with a radius r centered on center coordinates of a voxel region including 2×2×2 voxels in which a candidate point for the reference point exists may be derived. That is, in this case, for example, as illustrated in D of FIG. 9, the centroid of points located in the region with the radius r centered on the center coordinates of the voxel region including the 2×2×2 voxels indicated by the dotted frame is derived. Note that in D of FIG. 9, a distribution of points actually arranged in a three-dimensional space is schematically illustrated on the two-dimensional plane. Furthermore, a black circle indicates center coordinates of a voxel region as a target from which the reference point is derived, and a white circle indicates a point in a region with a radius r centered on the center coordinates of the voxel region including 2×2×2 voxels.

In this manner, the present technology can also be applied to scalable non-compatible lifting that does not use a voxel structure.

<Method of Selecting Reference Point>

In the case of "Method 1" as described above, for example, a point close to the derived centroid can be set as the reference point. In a case where there is a plurality of "points close to the centroid", any one of the points is selected as the reference point. A method of the selection is arbitrary. For example, the reference point may be set as in each method illustrated in the table of a "method of selecting the reference point from a plurality of candidates" in FIG. 11.

Figure 12:
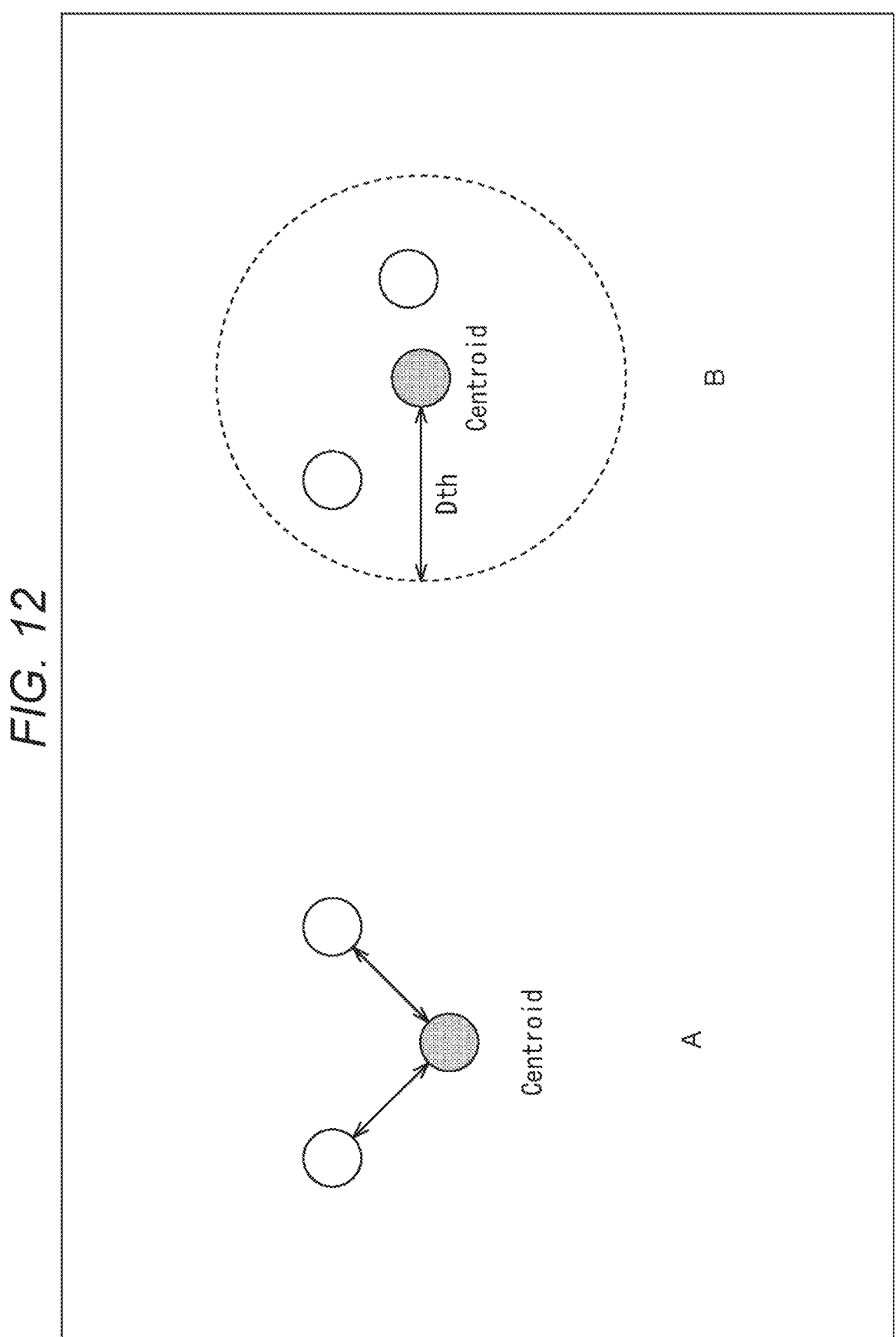
FIG. 12 is a diagram describing an example of the same condition.

For example, as illustrated in A of FIG. 12, there may be a plurality of points having equal distances to each other from the centroid. Furthermore, for example, as illustrated in B of FIG. 12, in order to suppress an increase in load due to calculation, for example, all points located sufficiently close may be assumed as "points close to the centroid". In the case of B of FIG. 12, all points located within the range with a radius Dth from the centroid are regarded as "points close to the centroid". In this case, there may be a plurality of "points close to the centroid".

In such a case, for example, as in Method (1) illustrated in the second row from the top of the table of the "method of selecting the reference point from a plurality of candidates" illustrated in FIG. 11, a first point to be the processing target in a predetermined search order may be selected.

Furthermore, for example, as in Method (2) illustrated in the third row from the top of the table of the "method of selecting the reference point from a plurality of candidates" illustrated in FIG. 11, the first or last point to be the processing target may be selected in the predetermined search order. For example, whether to select the first point to be the processing target in the predetermined search order or to select the last point to be the processing target in the predetermined search order may be switched for each hierarchy.

Moreover, for example, as in Method (3) illustrated in the fourth row from the top of the table of the "method of selecting the reference point from a plurality of candidates" illustrated in FIG. 11, the point to be the processing target may be selected in middle (number/2) in the predetermined search order.

Furthermore, for example, as in Method (4) illustrated in the fifth row from the top of the table of the "method of selecting the reference point from a plurality of candidates" illustrated in FIG. 11, the point to be the processing target may be selected in the order designated in the predetermined search order. That is, an Nth point to be the processing target in the predetermined search order may be selected. This designation order (N) may be determined in advance or may be settable by a user, an application, or the like. Furthermore, in a case where the designated rank can be set, information regarding the designated order (N) may be signaled (transmitted).

As in the above Methods (1) to (4), in a case where there is a plurality of candidates of substantially the same condition with respect to the centroid, the reference point may be set on the basis of the predetermined search order from among the plurality of candidates.

Note that the search order is arbitrary. For example, the order may be the Morton order or may be other than the Morton order. Furthermore, this search order may be defined in advance by standards or the like, or may be settable by a user, an application, or the like. In a case where the search order can be set, information regarding the search order may be signaled (transmitted).

Moreover, for example, as in Method (5) illustrated in the sixth row from the top of the table of the "method of selecting the reference point from a plurality of candidates" illustrated in FIG. 11, the centroid derivation target range may be set to a wider range, the centroid of points within the centroid derivation target range of the wide range may be derived, and the point may be selected using the newly derived centroid. That is, the centroid may be derived again by changing the condition.

<Encoding Device>

Figure 13:
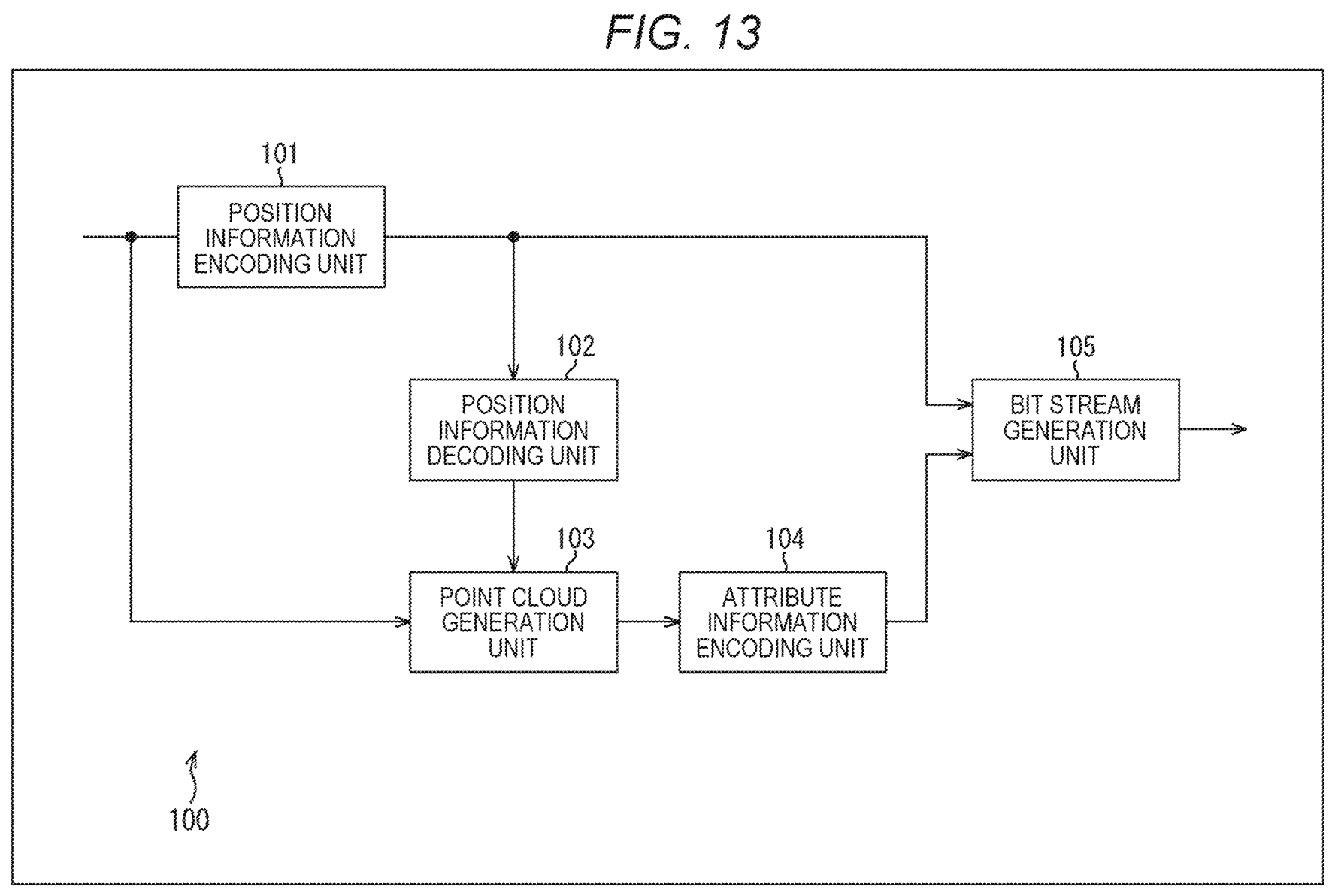

Next, a device to which the present technology is applied will be described. FIG. 13 is a block diagram illustrating an example of a configuration of an encoding device that is an aspect of an information processing device to which ("Method 1" of) the present technology is applied. An encoding device 100 illustrated in FIG. 13 is a device that encodes the point cloud (3D data). The encoding device 100 encodes the point cloud by applying the present technology described in the present embodiment.

Note that while FIG. 13 illustrates main elements such as processing units and data flows, those illustrated in FIG. 13 do not necessarily include all elements. That is, in the encoding device 100, a processing unit not illustrated as a block in FIG. 13 may exist, or a process or data flow not illustrated as an arrow or the like in FIG. 13 may exist.

As illustrated in FIG. 13, the encoding device 100 includes a position information encoding unit 101, a position information decoding unit 102, a point cloud generation unit 103, an attribute information encoding unit 104, and a bit stream generation unit 105.

The position information encoding unit 101 encodes the geometry data (position information) of the point cloud (3D data) input to the encoding device 100. A method for the encoding is arbitrary as long as it is a method compatible with scalable decoding. For example, the position information encoding unit 101 hierarchizes the geometry data to generate the Octree, and encodes the Octree. Furthermore, for example, a process such as filtering or quantization for noise suppression (denoise) may be performed. The position information encoding unit 101 supplies coded data of the generated geometry data to the position information decoding unit 102 and the bit stream generation unit 105.

The position information decoding unit 102 acquires the coded data of the geometry data supplied from the position information encoding unit 101, and decodes the coded data. A method of the decoding is arbitrary as long as it is a method corresponding to encoding by the position information encoding unit 101. For example, a process such as filtering or inverse quantization for denoise may be performed. The position information decoding unit 102 supplies the generated geometry data (decoding result) to the point cloud generation unit 103.

The point cloud generation unit 103 acquires the attribute data (attribute information) of the point cloud input to the encoding device 100 and the geometry data (decoding result) supplied from the position information decoding unit 102. The point cloud generation unit 103 performs a process (recoloring process) of matching the attribute data with the geometry data (decoding result). The point cloud generation unit 103 supplies the attribute data corresponding to the geometry data (decoding result) to the attribute information encoding unit 104.

The attribute information encoding unit 104 acquires the geometry data (decoding result) and the attribute data supplied from the point cloud generation unit 103. The attribute information encoding unit 104 encodes the attribute data using the geometry data (decoding result) and generates coded data of the attribute data.

At that time, the attribute information encoding unit 104 applies the above-described present technology (Method 1) to encode the attribute data. The attribute information encoding unit 104 supplies the coded data of the generated attribute data to the bit stream generation unit 105.

The bit stream generation unit 105 acquires the coded data of the geometry data supplied from the position information encoding unit 101. Furthermore, the bit stream generation unit 105 acquires the coded data of the attribute data supplied from the attribute information encoding unit 104. The bit stream generation unit 105 generates a bit stream including the coded data. The bit stream generation unit 105 outputs the generated bitstream to an outside of the encoding device 100.

With such a configuration, the encoding device 100 can obtain the centroid of points in the hierarchization of the attribute data and set the reference point on the basis of the centroid. By referring to a point close to the centroid in this manner, a point close to more other points can be set as the reference point. Therefore, in short, the reference point can be set so as to suppress a decrease in prediction accuracy for more prediction points, and a decrease in encoding efficiency can be suppressed.

Note that each of these processing units (the position information encoding unit 101 to the bit stream generation unit 105) of the encoding device 100 has an arbitrary configuration. For example, each processing unit may be configured by a logic circuit that achieves the above-described processing. Furthermore, each processing unit may include, for example, a central processing unit (CPU), a read only memory (ROM), a random access memory (RAM), and the like, and execute a program using them, to thereby implement the above-described processing. Of course, each processing unit may have both the configurations, and a part of the above-described processing may be implemented by a logic circuit and the other may be implemented by executing a program. The configurations of the processing units may be independent from each other, and for example, a part of the processing units may implement a part of the above-described processing by a logic circuit, another part of the processing units may implement the above-described processing by executing a program, and still another of the processing units may implement the above-described processing by both the logic circuit and the execution of the program.

<Attribute Information Encoding Unit>

Figure 14:
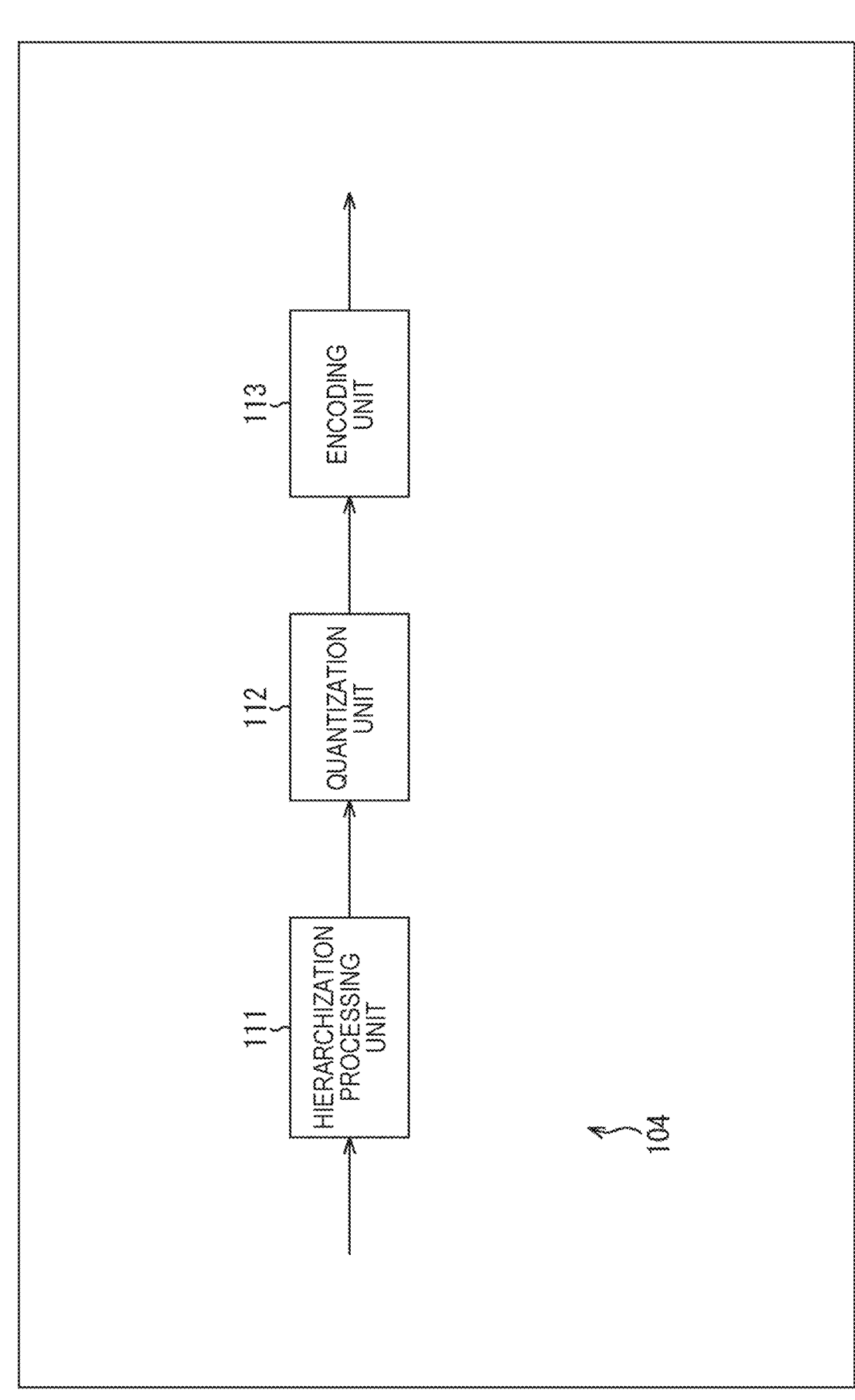
FIG. 14 is a block diagram illustrating a main configuration example of an attribute information encoding unit.

FIG. 14 is a block diagram illustrating a main configuration example of the attribute information encoding unit 104 (FIG. 13). Note that while FIG. 14 illustrates main elements such as processing units and data flows, those illustrated in FIG. 14 do not necessarily include all elements. That is, in the attribute information encoding unit 104, a processing unit not illustrated as a block in FIG. 14 may exist, or a process or data flow not illustrated as an arrow or the like in FIG. 14 may exist.

As illustrated in FIG. 14, the attribute information encoding unit 104 includes a hierarchization processing unit 111, a quantization unit 112, and an encoding unit 113.

The hierarchization processing unit 111 performs a process related to hierarchization of attribute data. For example, the hierarchization processing unit 111 acquires the attribute data and the geometry data (decoding result) supplied from the point cloud generation unit 103. The hierarchization processing unit 111 hierarchizes the attribute data using the geometry data. At that time, the hierarchization processing unit 111 performs hierarchization by applying the above-described present technology (Method 1). That is, the hierarchization processing unit 111 derives the centroid of points in each hierarchy, and selects the reference point on the basis of the centroid. Then, the hierarchization processing unit 111 sets a reference relationship in each hierarchy of the hierarchical structure, derives a predicted value of the attribute data of each prediction point using the attribute data of the reference point on the basis of the reference relationship, and derives a difference value between the attribute data and the predicted value. The hierarchization processing unit 111 supplies the hierarchized attribute data (difference value) to the quantization unit 112.

At that time, the hierarchization processing unit 111 can also generate control information regarding hierarchization. The hierarchization processing unit 111 can also supply the generated control information to the quantization unit 112 together with the attribute data (difference value).

The quantization unit 112 acquires the attribute data (difference value) and the control information supplied from the hierarchization processing unit 111. The quantization unit 112 quantizes the attribute data (difference value). A method of the quantization is arbitrary. The quantization unit 112 supplies the quantized attribute data (difference value) and control information to the encoding unit 113.

The encoding unit 113 acquires the quantized attribute data (difference value) and control information supplied from the quantization unit 112. The encoding unit 113 encodes the quantized attribute data (difference value) and generates coded data of the attribute data. A method of the encoding is arbitrary. Furthermore, the encoding unit 113 includes control information in the generated coded data. In other words, the coded data of the attribute data including the control information is generated. The encoding unit 113 supplies the generated coded data to the bit stream generation unit 105.

By performing the hierarchization as described above, the attribute information encoding unit 104 can set a point close to the centroid as the reference point, and thus can set a point close to more other points as the reference point. Therefore, in short, the reference point can be set so as to suppress a decrease in prediction accuracy for more prediction points, and a decrease in encoding efficiency can be suppressed.

Note that these processing units (the hierarchization processing unit 111 to the encoding unit 113) have an arbitrary configuration. For example, each processing unit may be configured by a logic circuit that achieves the above-described processing. Furthermore, each processing unit may include, for example, a CPU, a ROM, a RAM, and the like, and execute a program using them, to thereby implement the above-described processing. Of course, each processing unit may have both the configurations, and a part of the above-described processing may be implemented by a logic circuit and the other may be implemented by executing a program. The configurations of the processing units may be independent from each other, and for example, a part of the processing units may implement a part of the above-described processing by a logic circuit, another part of the processing units may implement the above-described processing by executing a program, and still another of the processing units may implement the above-described processing by both the logic circuit and the execution of the program.

<Hierarchization Processing Unit>

Figure 15:
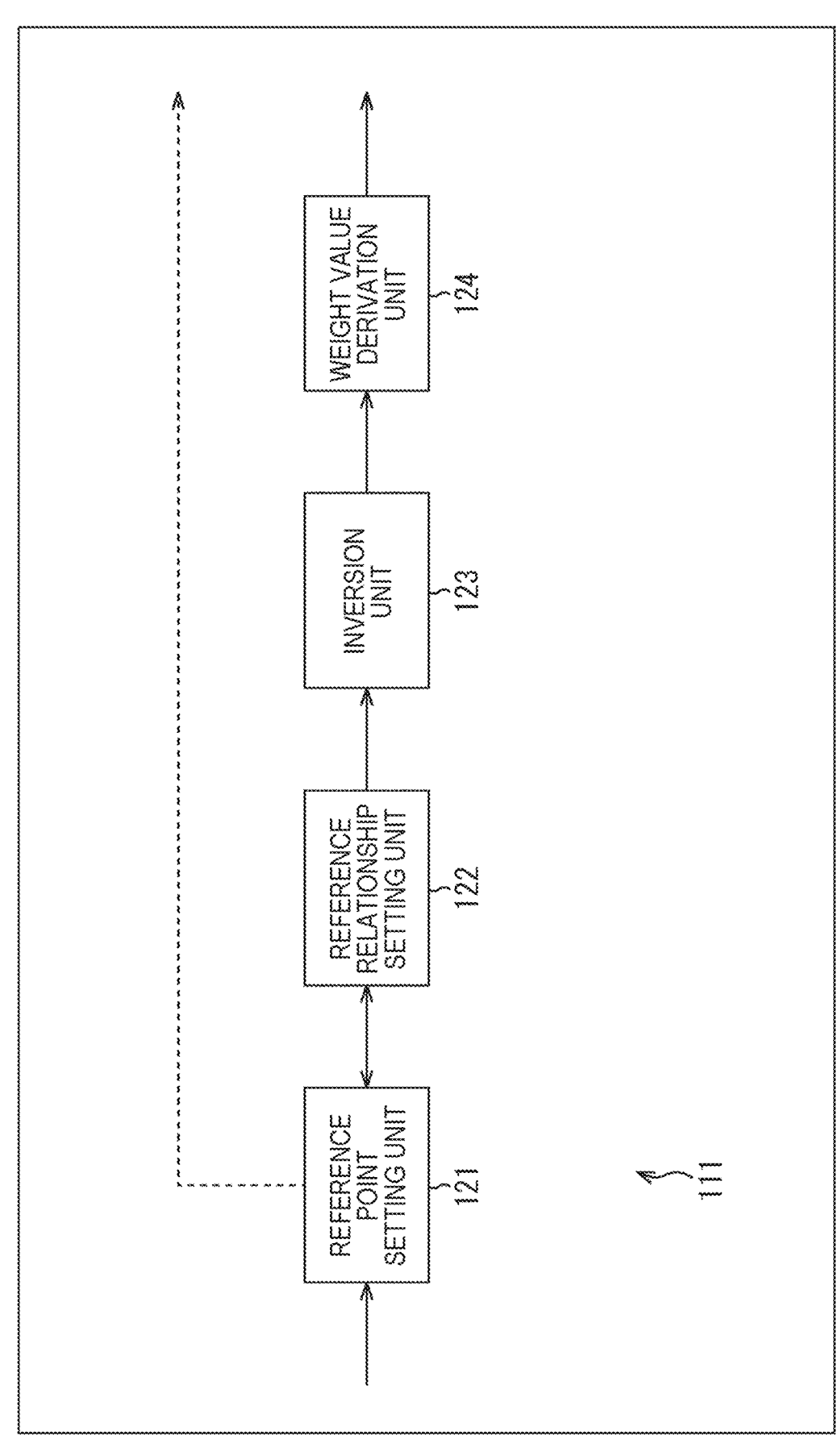
FIG. 15 is a block diagram illustrating a main configuration example of a hierarchization processing unit.

FIG. 15 is a block diagram illustrating a main configuration example of the hierarchization processing unit 111 (FIG. 14). Note that while FIG. 15 illustrates main elements such as processing units and data flows, those illustrated in FIG. 15 do not necessarily include all elements. That is, in the hierarchization processing unit 111, a processing unit not illustrated as a block in FIG. 15 may exist, or a process or data flow not illustrated as an arrow or the like in FIG. 15 may exist.

As illustrated in FIG. 15, the hierarchization processing unit 111 includes a reference point setting unit 121, a reference relationship setting unit 122, an inversion unit 123, and a weight value derivation unit 124.

The reference point setting unit 121 performs a process related to setting of the reference point. For example, the reference point setting unit 121 classifies a group of points as the processing target into the reference point to which the attribute data is referred and the prediction point for deriving a predicted value of the attribute data on the basis of the geometry data of each point. That is, the reference point setting unit 121 sets the reference point and the prediction point. The reference point setting unit 121 recursively repeats this process with respect to the reference point. That is, the reference point setting unit 121 sets the reference point and the prediction point in the hierarchy as the processing target with the reference point set in the previous hierarchy as the processing target. In this manner, the hierarchical structure is constructed. That is, the attribute data is hierarchized. The reference point setting unit 121 supplies information indicating the set reference point and prediction point of each hierarchy to the reference relationship setting unit 122.

The reference relationship setting unit 122 performs a process related to setting of the reference relationship of each hierarchy on the basis of the information supplied from the reference point setting unit 121. That is, the reference relationship setting unit 122 sets, for each prediction point of each hierarchy, a reference point (that is, a reference destination) to be referred to for deriving the predicted value. Then, the reference relationship setting unit 122 derives the predicted value of the attribute data of each prediction point on the basis of the reference relationship. That is, the reference relationship setting unit 122 derives the predicted value of the attribute data of the prediction point using the attribute data of the reference point set as the reference destination. Moreover, the reference relationship setting unit 122 derives a difference value between the derived predicted value and the attribute data of the prediction point. The reference relationship setting unit 122 supplies the derived difference value (hierarchized attribute data) to the inversion unit 123 for each hierarchy.

Note that the reference point setting unit 121 can generate the control information and the like regarding the hierarchization of the attribute data as described above, supply the control information and the like to the quantization unit 112, and transmit the control information and the like to the decoding side.

The inversion unit 123 performs a process related to inversion of hierarchies. For example, the inversion unit 123 acquires the hierarchized attribute data supplied from the reference relationship setting unit 122. In the attribute data, information of each hierarchy is hierarchized in the order of generation. The inversion unit 123 inverts the hierarchy of the attribute data. For example, the inversion unit 123 assigns a hierarchy number (a number for identifying a hierarchy in which a value is incremented by one every time the highest hierarchy is lowered by zero or one, and the lowest hierarchy has the maximum value) to each hierarchy of the attribute data in the reverse order of the generation order, so that the generation order is the order from the lowest hierarchy to the highest hierarchy. The inversion unit 123 supplies the attribute data in which the hierarchy is inverted to the weight value derivation unit 124.

The weight value derivation unit 124 performs a process related to weighting. For example, the weight value derivation unit 124 acquires the attribute data supplied from the inversion unit 123. The weight value derivation unit 124 derives a weight value of the acquired attribute data. A method of deriving the weight value is arbitrary. The weight value derivation unit 124 supplies the attribute data (difference value) and the derived weight value to the quantization unit 112 (FIG. 14). Furthermore, the weight value derivation unit 124 may supply the derived weight value to the quantization unit 112 as the control information and transmit the weight value to the decoding side.

In the above-described hierarchization processing unit 111, the above-described present technology can be applied to the reference point setting unit 121. That is, the reference relationship setting unit 122 can apply the above-described "Method 1", derive the centroid of points, and set the reference point on the basis of the centroid. In this manner, it is possible to suppress a decrease in prediction accuracy and a decrease in encoding efficiency.

Note that this hierarchization procedure is arbitrary. For example, the processing of the reference point setting unit 121 and the processing of the reference relationship setting unit 122 may be executed in parallel. For example, the reference point setting unit 121 may set the reference point and the prediction point for each hierarchy, and the reference relationship setting unit 122 may set the reference relationship.

Note that these processing units (the reference point setting unit 121 to the weight value derivation unit 124) have an arbitrary configuration. For example, each processing unit may be configured by a logic circuit that achieves the above-described processing. Furthermore, each processing unit may include, for example, a CPU, a ROM, a RAM, and the like, and execute a program using them, to thereby implement the above-described processing. Of course, each processing unit may have both the configurations, and a part of the above-described processing may be implemented by a logic circuit and the other may be implemented by executing a program. The configurations of the processing units may be independent from each other, and for example, a part of the processing units may implement a part of the above-described processing by a logic circuit, another part of the processing units may implement the above-described processing by executing a program, and still another of the processing units may implement the above-described processing by both the logic circuit and the execution of the program.

<Flow of Encoding Processing>

Next, processing executed by the encoding device 100 will be described. The encoding device 100 encodes the data of the point cloud by executing encoding processing. An example of a flow of this encoding processing will be described with reference to a flowchart of FIG. 16.

When the encoding processing is started, in step S101, the position information encoding unit 101 of the encoding device 100 encodes the geometry data (position information) of the input point cloud, and generates coded data of the geometry data.

In step S102, the position information decoding unit 102 decodes the coded data of the geometry data generated in step S101, and generates the position information.

In step S103, the point cloud generation unit 103 performs the recoloring process using the attribute data (attribute information) of the input point cloud and the geometry data (decoding result) generated in step S102, and associates the attribute data with the geometry data.

In step S104, the attribute information encoding unit 104 executes the attribute information encoding processing to thereby encode the attribute data subjected to the recoloring process in step S103 and generate coded data of the attribute data. At that time, the attribute information encoding unit 104 performs processing by applying the above-described present technology (Method 1). For example, in the hierarchization of the attribute data, the attribute information encoding unit 104 derives the centroid of points and sets the reference point on the basis of the centroid. Details of the attribute information encoding processing will be described later.

In step S105, the bit stream generation unit 105 generates and outputs a bit stream including the coded data of the geometry data generated in step S101 and the coded data of the attribute data generated in step S104.

When the processing of step S105 ends, the encoding processing ends.

By performing the processing of each step in this manner, the encoding device 100 can suppress a decrease in prediction accuracy and can suppress a decrease in encoding efficiency.

<Flow of Attribute Information Encoding Processing>

Next, an example of a flow of the attribute information encoding processing executed in step S104 of FIG. 16 will be described with reference to a flowchart of FIG. 17.

When the attribute information encoding processing is started, the hierarchization processing unit 111 of the attribute information encoding unit 104 hierarchizes the attribute data by executing the hierarchization process in step S111. That is, the reference point and the prediction point of each hierarchy are set, and the reference relationship is further set. At that time, the hierarchization processing unit 111 performs hierarchization by applying the above-described present technology (Method 1). For example, in the hierarchization of the attribute data, the attribute information encoding unit 104 derives the centroid of points and sets the reference point on the basis of the centroid. Details of the hierarchization processing will be described later.

In step S112, the hierarchization processing unit 111 derives a predicted value of the attribute data for each prediction point in each hierarchy of the attribute data hierarchized in step S111, and derives a difference value between the attribute data of the prediction point and the predicted value.

In step S113, the quantization unit 112 quantizes each difference value derived in step S112.

In step S114, the encoding unit 113 encodes the difference value quantized in step S112, and generates the coded data of the attribute data.

Figure 16:
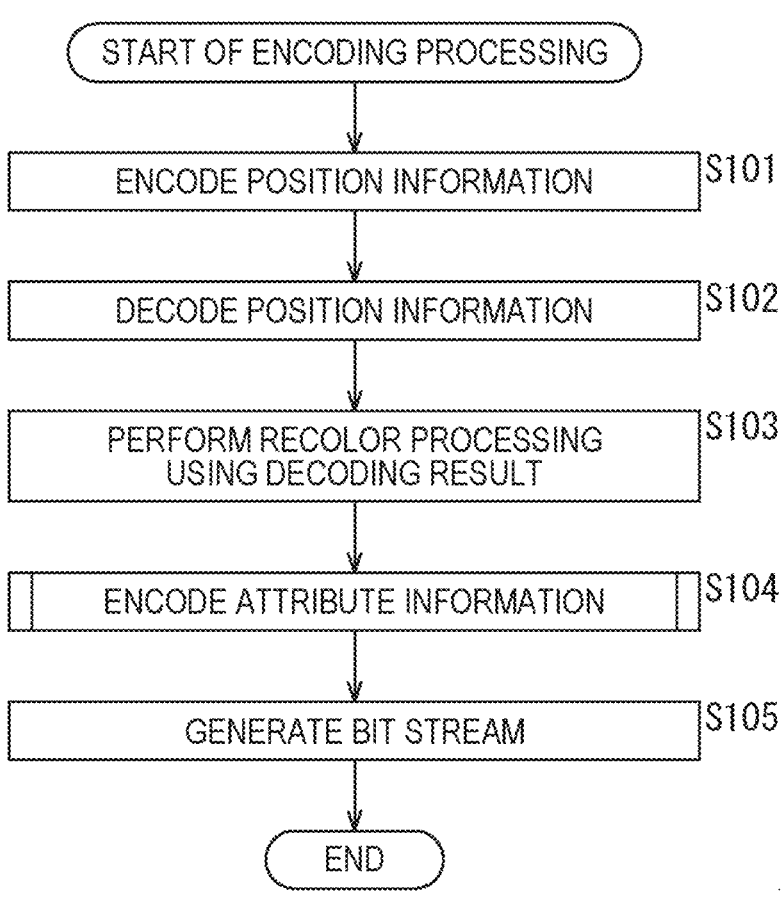
FIG. 16 is a flowchart describing an example of a flow of encoding processing.
Figure 17:
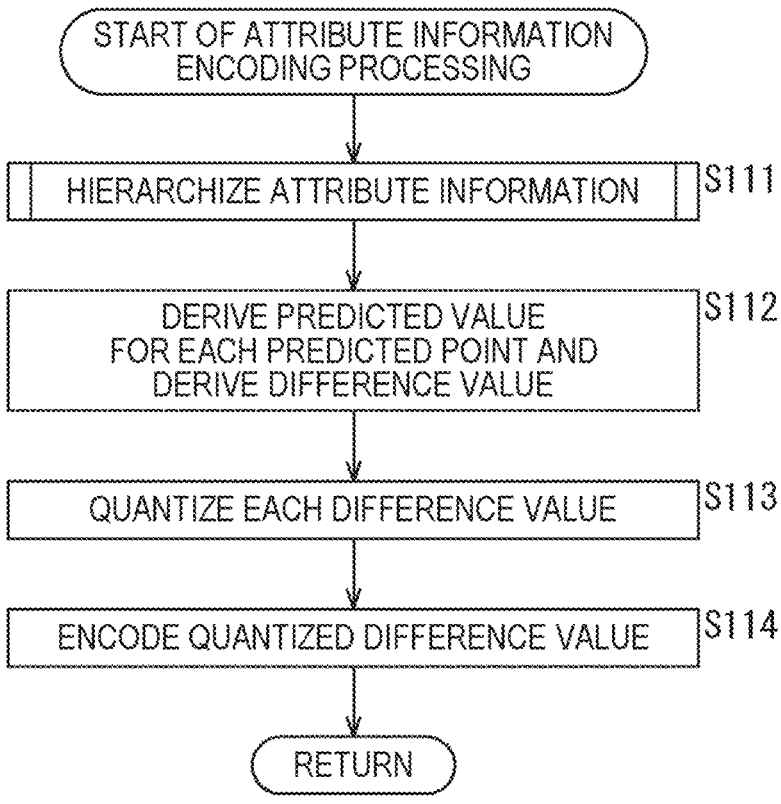
FIG. 17 is a flowchart describing an example of a flow of attribute information encoding processing.

When the processing of step S114 ends, the attribute information encoding processing ends, and the processing returns to FIG. 16.

By performing the processing of each step in this manner, the hierarchization processing unit 111 can apply the above-described "Method 1", derive the centroid of points in the hierarchization of the attribute data, and set the reference point on the basis of the centroid. Therefore, the hierarchization processing unit 111 can hierarchize the attribute data so as to suppress a decrease in prediction accuracy, and thus it is possible to suppress a decrease in encoding efficiency.

<Flow of Hierarchization Processing>

Next, an example of a flow of the hierarchization processing executed in step S111 of FIG. 17 will be described with reference to a flowchart of FIG. 18.

When the hierarchization processing is started, in step S121, the reference point setting unit 121 of the hierarchization processing unit 111 sets the value of the variable LoD Index indicating the hierarchy as the processing target to an initial value (for example, "0").

In step S122, the reference point setting unit 121 executes reference point setting processing, and sets the reference point in the hierarchy as the processing target (that is, the prediction point is also set). Details of the reference point setting processing will be described later.

In step S123, the reference relationship setting unit 122 sets a reference relationship (which reference point is referred to in deriving the predicted value of each prediction point) of the hierarchy as the processing target.

In step S124, the reference point setting unit 121 increments the LoD Index and sets the processing target to the next hierarchy.

In step S125, the reference point setting unit 121 determines whether or not all the points have been processed. In a case where it is determined that there is an unprocessed point, that is, in a case where it is determined that the hierarchization is not completed, the processing returns to step S122 and the processing of step S122 and subsequent steps is repeated. As described above, the processing of steps S122 to S125 is executed for each hierarchy, and in a case where it is determined in step S125 that all the points have been processed, the processing proceeds to step S126.

In step S126, the inversion unit 123 inverts the hierarchy of the attribute data generated as described above, and assigns a hierarchy number to each hierarchy in a direction opposite to the generation order.

In step S127, the weight value derivation unit 124 derives a weight value for the attribute data of each hierarchy.

When the processing of step S127 ends, the processing returns to FIG. 14.

By performing the processing of each step in this manner, the hierarchization processing unit 111 can apply the above-described "Method 1", derive the centroid of points in the hierarchization of the attribute data, and set the reference point on the basis of the centroid. Therefore, the hierarchization processing unit 111 can hierarchize the attribute data so as to suppress a decrease in prediction accuracy, and thus it is possible to suppress a decrease in encoding efficiency.

<Flow of Reference Relationship Setting Processing>

Next, an example of a flow of the reference point setting processing executed in step S122 of FIG. 18 will be described with reference to a flowchart of FIG. 19.

When the reference point setting processing is started, in step S141, the reference point setting unit 121 specifies a group of points used for deriving the centroid, and derives the centroid of the group of points as the processing target. A method of deriving the centroid is arbitrary as described above. For example, the centroid may be derived using any of the methods illustrated in the table of FIG. 8.

In step S142, the reference point setting unit 121 selects a point close to the centroid derived in step S141 as the reference point. A method of selecting the reference point is arbitrary. For example, the centroid may be derived using any of the methods illustrated in the table of FIG. 11.

Figure 18:
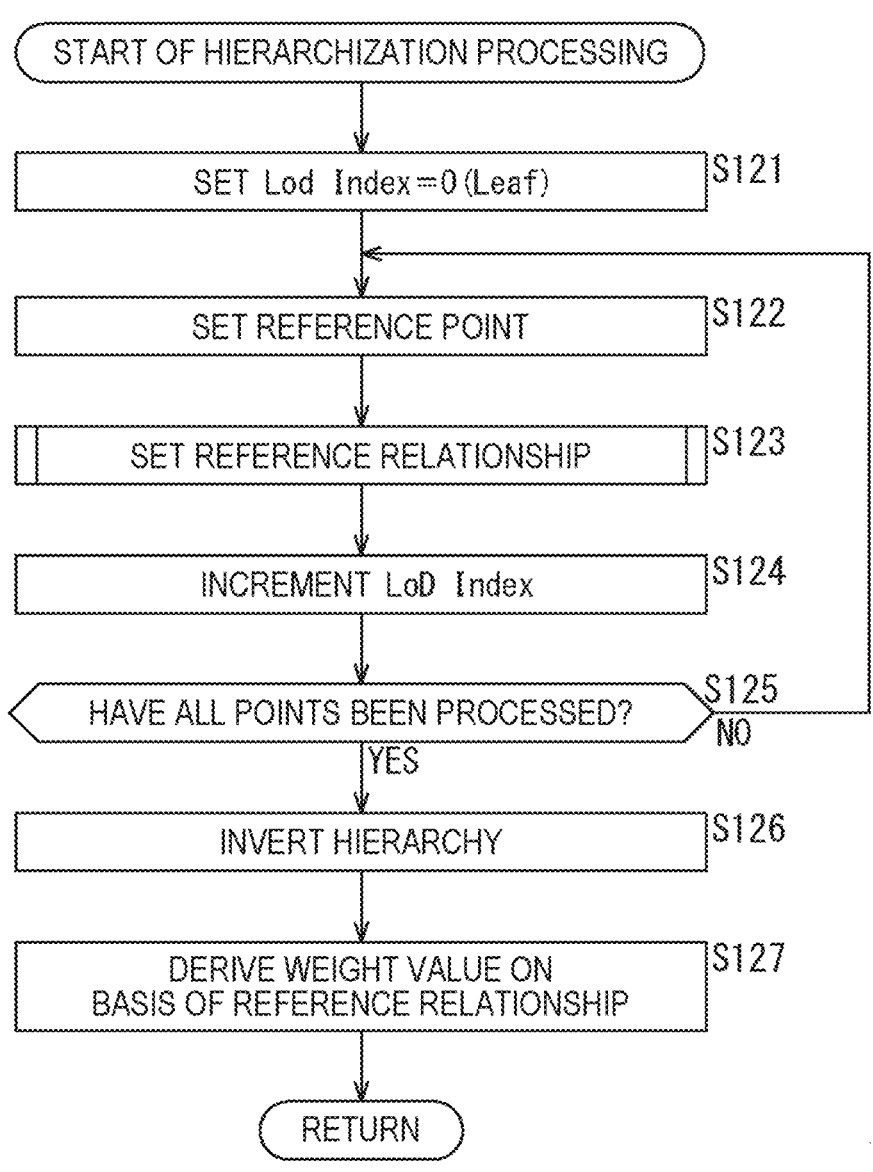
FIG. 18 is a flowchart describing an example of a flow of hierarchization processing.
Figure 19:
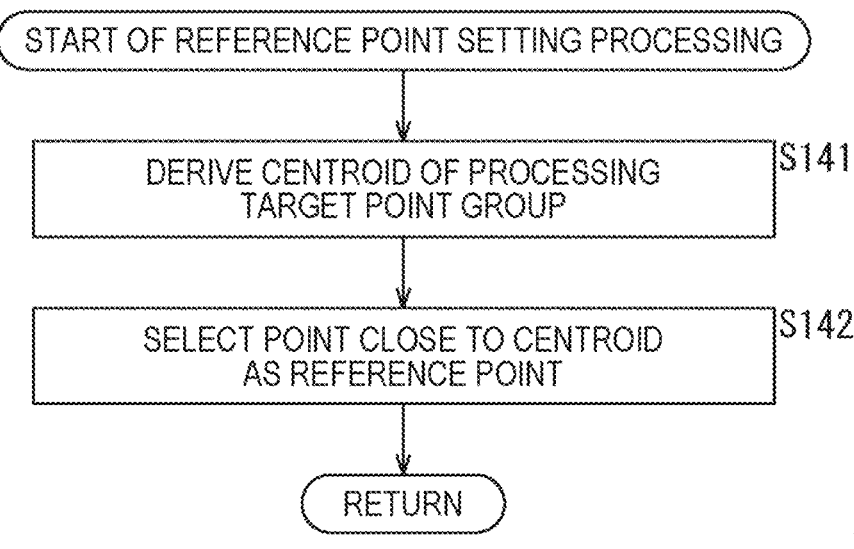
FIG. 19 is a flowchart describing an example of a flow of reference point setting processing.

When the processing of step S142 ends, the reference point setting processing ends, and the processing returns to FIG. 18.

By performing the processing of each step in this manner, the reference point setting unit 121 can apply the above-described "Method 1", derive the centroid of points in the hierarchization of the attribute data, and set the reference point on the basis of the centroid. Therefore, the hierarchization processing unit 111 can hierarchize the attribute data so as to suppress a decrease in prediction accuracy, and thus it is possible to suppress a decrease in encoding efficiency.

<Decoding Device>

Figure 20:
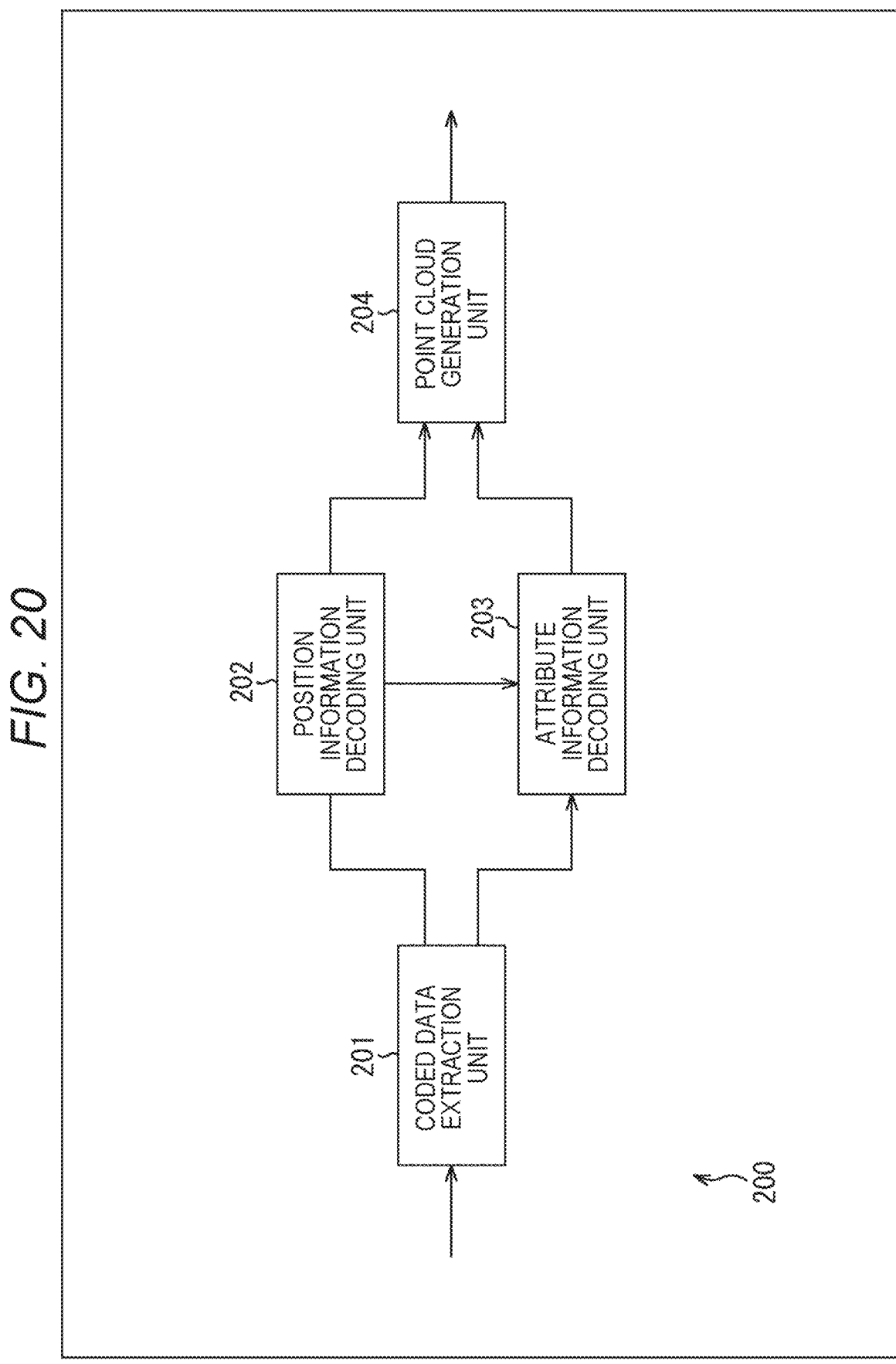
FIG. 20 is a block diagram illustrating a main configuration example of a decoding device.

Next, another example of a device to which the present technology is applied will be described. FIG. 20 is a block diagram illustrating an example of a configuration of a decoding device that is an aspect of an information processing device to which the present technology is applied. A decoding device 200 illustrated in FIG. 20 is a device that decodes coded data of the point cloud (3D data). The decoding device 200 decodes the coded data of the point cloud by applying the present technology (Method 1) described in the present embodiment.

Note that while FIG. 20 illustrates main elements such as processing units and data flows, those illustrated in FIG. 20 do not necessarily include all elements. That is, in the decoding device 200, a processing unit not illustrated as a block in FIG. 20 may exist, or a process or data flow not illustrated as an arrow or the like in FIG. 20 may exist.

As illustrated in FIG. 20, the decoding device 200 includes a coded data extraction unit 201, a position information decoding unit 202, an attribute information decoding unit 203, and a point cloud generation unit 204.

The coded data extraction unit 201 acquires and holds a bit stream input to the decoding device 200. The coded data extraction unit 201 extracts coded data of the geometry data (position information) and the attribute data (attribute information) from the held bit stream. The coded data extraction unit 201 supplies the coded data of the extracted geometry data to the position information decoding unit 202. The coded data extraction unit 201 supplies the coded data of the extracted attribute data to the attribute information decoding unit 203.

The position information decoding unit 202 acquires the coded data of the geometry data supplied from the coded data extraction unit 201. The position information decoding unit 202 decodes the coded data of the geometry data, and generates the geometry data (decoding result). A method of the decoding is arbitrary as long as it is a method similar to that in the case of the position information decoding unit 102 of the encoding device 100. The position information decoding unit 202 supplies the generated geometry data (decoding result) to the attribute information decoding unit 203 and the point cloud generation unit 204.

The attribute information decoding unit 203 acquires the coded data of the attribute data supplied from the coded data extraction unit 201. The attribute information decoding unit 203 acquires the geometry data (decoding result) supplied from the position information decoding unit 202. The attribute information decoding unit 203 decodes the coded data of the attribute data by the method to which the above-described present technology (Method 1) is applied using the position information (decoding result) and generates the attribute data (decoding result). The attribute information decoding unit 203 supplies the generated attribute data (decoding result) to the point cloud generation unit 204.

The point cloud generation unit 204 acquires the geometry data (decoding result) supplied from the position information decoding unit 202. The point cloud generation unit 204 acquires the attribute data (decoding result) supplied from the attribute information decoding unit 203. The point cloud generation unit 204 generates a point cloud (decoding result) using the geometry data (decoding result) and the attribute data (decoding result). The point cloud generation unit 204 outputs data of the generated point cloud (decoding result) to an outside of the decoding device 200.

With such a configuration, the decoding device 200 can select a point close to the centroid of points as the reference point in the de-hierarchization. Therefore, the decoding device 200 can correctly decode the coded data of the attribute data encoded by the encoding device 100 described above, for example. Therefore, a decrease in prediction accuracy can be suppressed, and a decrease in encoding efficiency can be suppressed.

Note that these processing units (the coded data extraction unit 201 to the point cloud generation unit 204) have an arbitrary configuration. For example, each processing unit may be configured by a logic circuit that achieves the above-described processing. Furthermore, each processing unit may include, for example, a CPU, a ROM, a RAM, and the like, and execute a program using them, to thereby implement the above-described processing. Of course, each processing unit may have both the configurations, and a part of the above-described processing may be implemented by a logic circuit and the other may be implemented by executing a program. The configurations of the processing units may be independent from each other, and for example, a part of the processing units may implement a part of the above-described processing by a logic circuit, another part of the processing units may implement the above-described processing by executing a program, and still another of the processing units may implement the above-described processing by both the logic circuit and the execution of the program.

<Attribute Information Decoding Unit>

Figure 21:
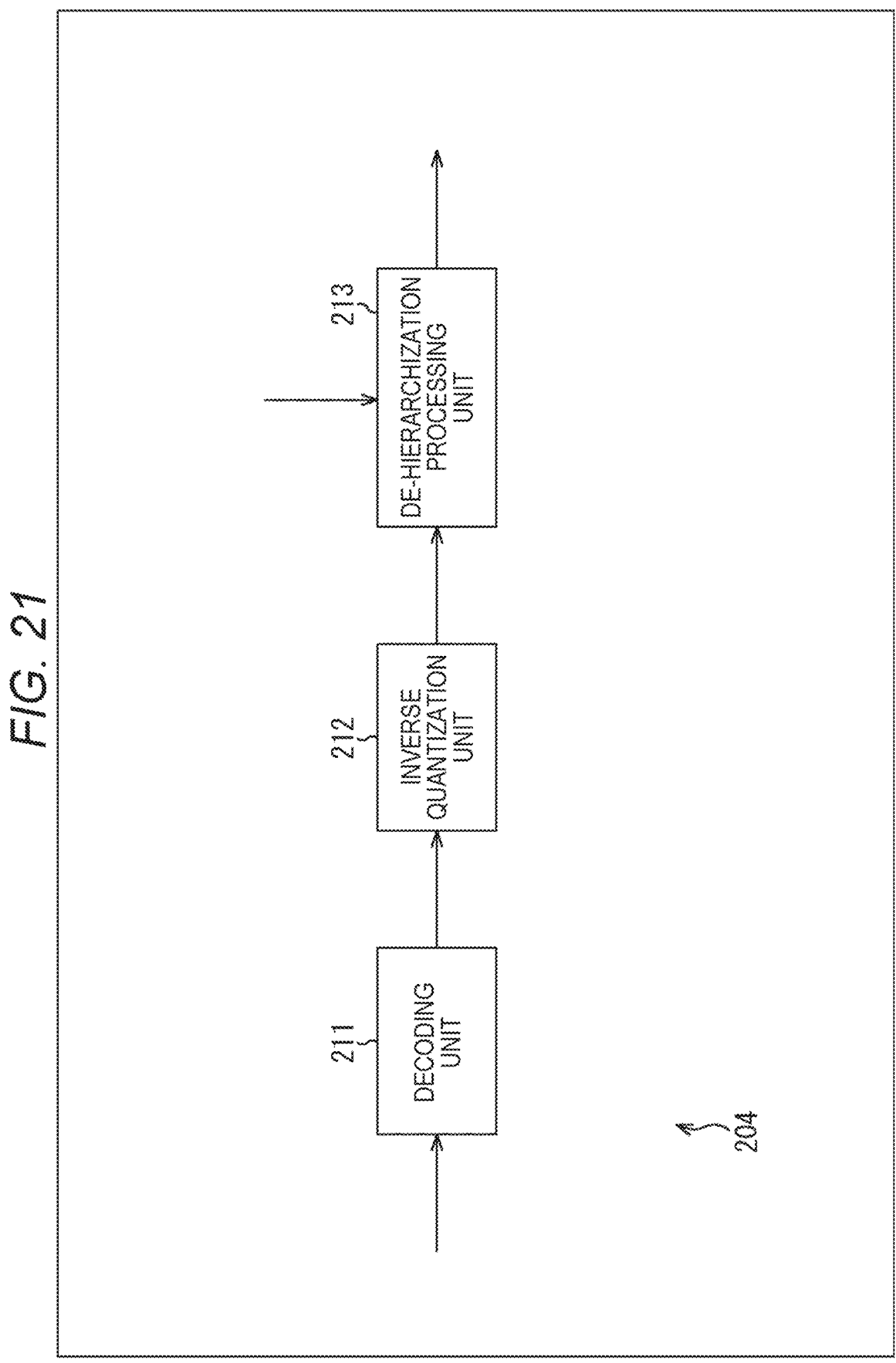
FIG. 21 is a block diagram illustrating a main configuration example of an attribute information decoding unit.

FIG. 21 is a block diagram illustrating a main configuration example of the attribute information decoding unit 203 (FIG. 20). Note that while FIG. 21 illustrates main elements such as processing units and data flows, those illustrated in FIG. 21 do not necessarily include all elements. That is, in the attribute information decoding unit 203, a processing unit not illustrated as a block in FIG. 21 may exist, or a process or data flow not illustrated as an arrow or the like in FIG. 21 may exist.

As illustrated in FIG. 21, the attribute information decoding unit 203 includes a decoding unit 211, an inverse quantization unit 212, and a de-hierarchization processing unit 213.

The decoding unit 211 performs processing related to decoding of the coded data of the attribute data. For example, the decoding unit 211 acquires the coded data of the attribute data supplied to the attribute information decoding unit 203.

The decoding unit 211 decodes the coded data of the attribute data, and generates the attribute data (decoding result). A method of the decoding is arbitrary as long as it is a method corresponding to the encoding method by the encoding unit 113 (FIG. 14) of the encoding device 100. Furthermore, the generated attribute data (decoding result) corresponds to the attribute data before encoding, is a difference value between the attribute data and a predicted value thereof, and is quantized. The decoding unit 211 supplies the generated attribute data (decoding result) to the inverse quantization unit 212.

Note that, in a case where the coded data of the attribute data includes the control information regarding the weight value and the control information regarding the hierarchization of the attribute data, the decoding unit 211 also supplies the control information to the inverse quantization unit 212.

The inverse quantization unit 212 performs processing related to inverse quantization of the attribute data. For example, the inverse quantization unit 212 acquires the attribute data (decoding result) and the control information supplied from the decoding unit 211.

The inverse quantization unit 212 inversely quantizes the attribute data (decoding result). At that time, in a case where the control information regarding the weight value is supplied from the decoding unit 211, the inverse quantization unit 212 also acquires the control information and inversely quantizes the attribute data (decoding result) on the basis of the control information (using the weight value derived on the basis of the control information).

Furthermore, in a case where the control information regarding the hierarchization of the attribute data is supplied from the decoding unit 211, the inverse quantization unit 212 also acquires the control information.

The inverse quantization unit 212 supplies the inversely quantized attribute data (decoding result) to the de-hierarchization processing unit 213. Furthermore, in a case where the control information regarding the hierarchization of the attribute data is acquired from the decoding unit 211, the inverse quantization unit 212 also supplies the control information to the de-hierarchization processing unit 213.

The de-hierarchization processing unit 213 acquires the inversely quantized attribute data (decoding result) supplied from the inverse quantization unit 212. As described above, the attribute data is a difference value. Furthermore, the de-hierarchization processing unit 213 acquires the geometry data (decoding result) supplied from the position information decoding unit 202. Using the geometry data, the de-hierarchization processing unit 213 performs de-hierarchization, which is inverse processing of the hierarchization performed by the hierarchization processing unit 111 (FIG. 14) of the encoding device 100, on the acquired attribute data (difference value).

Here, the de-hierarchization will be described. For example, the de-hierarchization processing unit 213 hierarchizes the attribute data by a method similar to that of the encoding device 100 (hierarchization processing unit 111) on the basis of the geometry data supplied from the position information decoding unit 202. That is, the de-hierarchization processing unit 213 sets the reference point and the prediction point of each hierarchy on the basis of the decoded geometry data, and sets the hierarchical structure of the attribute data. The de-hierarchization processing unit 213 further uses the reference point and the prediction point to set a reference relationship (a reference destination for each prediction point) of each hierarchy of the hierarchical structure.

Then, the de-hierarchization processing unit 213 de-hierarchizes the acquired attribute data (difference value) using the hierarchical structure and the reference relationship of each hierarchy. That is, the de-hierarchization processing unit 213 derives the predicted value of the prediction point from the reference point according to the reference relationship, and restores the attribute data of each prediction point by adding the predicted value to the difference value. The de-hierarchization processing unit 213 performs this processing for each hierarchy from the higher hierarchy to the lower hierarchy. That is, the de-hierarchization processing unit 213 restores the attribute data of the prediction point of the hierarchy as the processing target as described above using the prediction point obtained by restoring the attribute data in a hierarchy higher than the hierarchy as the processing target as the reference point.

In the de-hierarchization performed in such a procedure, the de-hierarchization processing unit 213 sets the reference point by applying the above-described present technology (Method 1) when hierarchizing the attribute data on the basis of the decoded geometry data. That is, the de-hierarchization processing unit 213 derives the centroid of points and selects a point close to the centroid as the reference point. The de-hierarchization processing unit 213 supplies the de-hierarchized attribute data to the point cloud generation unit 204 (FIG. 20) as a decoding result.

By performing the de-hierarchization as described above, the de-hierarchization processing unit 213 can set a point close to the centroid as the reference point, and thus can hierarchize the attribute data so as to suppress a decrease in prediction accuracy. That is, the attribute information decoding unit 203 can correctly decode coded data encoded by a similar method. For example, the attribute information decoding unit 203 can correctly decode the coded data of the attribute data encoded by the attribute information encoding unit 104 described above. Therefore, a decrease in encoding efficiency can be suppressed.

Note that these processing units (the decoding unit 211 to the de-hierarchization processing unit 213) have an arbitrary configuration. For example, each processing unit may be configured by a logic circuit that achieves the above-described processing. Furthermore, each processing unit may include, for example, a CPU, a ROM, a RAM, and the like, and execute a program using them, to thereby implement the above-described processing. Of course, each processing unit may have both the configurations, and a part of the above-described processing may be implemented by a logic circuit and the other may be implemented by executing a program. The configurations of the processing units may be independent from each other, and for example, a part of the processing units may implement a part of the above-described processing by a logic circuit, another part of the processing units may implement the above-described processing by executing a program, and still another of the processing units may implement the above-described processing by both the logic circuit and the execution of the program.

<Flow of Decoding Processing>

Next, processing executed by the decoding device 200 will be described. The decoding device 200 decodes the coded data of the point cloud by executing decoding processing. An example of a flow of the decoding processing will be described with reference to a flowchart of FIG. 22.

When the decoding processing is started, in step S201, the coded data extraction unit 201 of the decoding device 200 acquires and holds a bit stream, and extracts the coded data of the geometry data and the coded data of the attribute data from the bit stream.

In step S202, the position information decoding unit 202 decodes the coded data of the extracted geometry data, and generates the geometry data (decoding result).

In step S203, the attribute information decoding unit 203 executes attribute information decoding processing, decodes the coded data of the attribute data extracted in step S201, and generates the attribute data (decoding result). At that time, the attribute information decoding unit 203 performs processing by applying the above-described present technology (Method 1). For example, in the hierarchization of the attribute data, the attribute information decoding unit 203 derives a centroid of points and sets a point close to the centroid as the reference point. Details of the attribute information decoding processing will be described later.

In step S204, the point cloud generation unit 204 generates and outputs the point cloud (decoding result) using the geometry data (decoding result) generated in step S202 and the attribute data (decoding result) generated in step S203.

When the processing of step S204 ends, the decoding processing ends.

By performing the processing of each step in this manner, the decoding device 200 can correctly decode the coded data of the attribute data encoded by a similar method. For example, the decoding device 200 can correctly decode the coded data of the attribute data encoded by the encoding device 100 described above. Therefore, a decrease in prediction accuracy can be suppressed, and a decrease in encoding efficiency can be suppressed.

<Flow of Attribute Information Decoding Processing>

Next, an example of a flow of the attribute information decoding processing executed in step S203 of FIG. 22 will be described with reference to a flowchart of FIG. 23.

When the attribute information decoding processing is started, the decoding unit 211 of the attribute information decoding unit 203 decodes the coded data of the attribute data and generates the attribute data (decoding result) in step S211. The attribute data (decoding result) is quantized as described above.

In step S212, the inverse quantization unit 212 inversely quantizes the attribute data (decoding result) generated in step S211 by executing the inverse quantization processing.

In step S213, the de-hierarchization processing unit 213 executes the de-hierarchization processing to de-hierarchize the attribute data (difference value) inversely quantized in step S212 and derive the attribute data of each point. At that time, the de-hierarchization processing unit 213 performs de-hierarchization by applying the above-described present technology (Method 1). For example, in the hierarchization of the attribute data, the de-hierarchization processing unit 213 derives a centroid of points and sets a point close to the centroid as the reference point. Details of the de-hierarchization processing will be described later.

Figure 22:
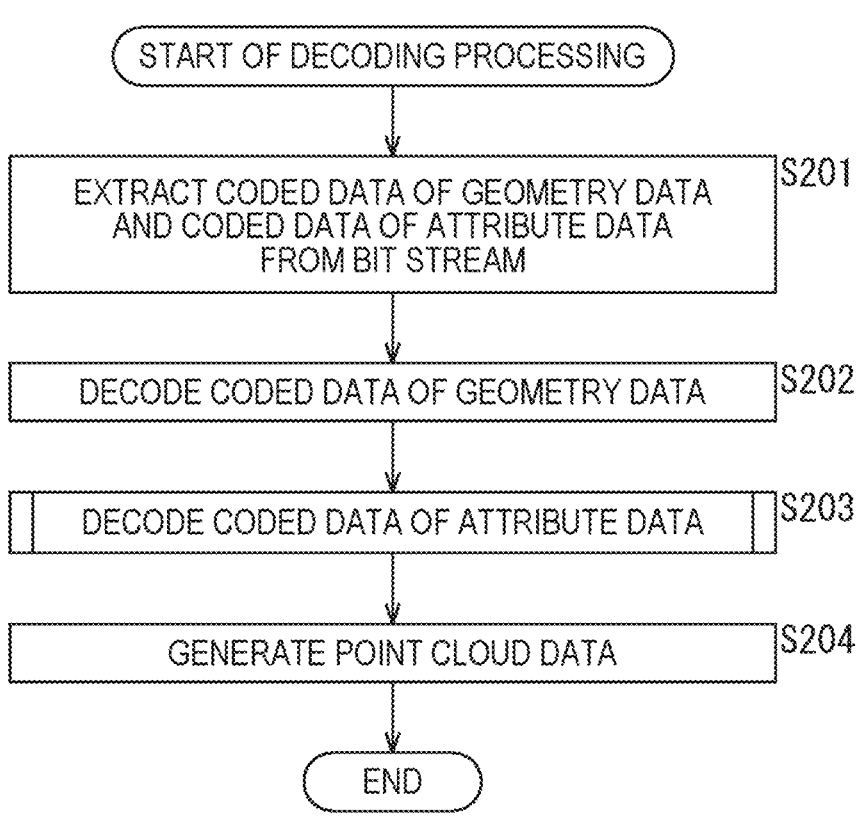
FIG. 22 is a flowchart describing an example of a flow of decoding processing.

When the processing of step S213 ends, the attribute information decoding processing ends, and the processing returns to FIG. 22.

By performing the processing of each step in this manner, the attribute information decoding unit 203 can apply the above-described "Method 1" and set a point close to the centroid of points as the reference point in the hierarchization of the attribute data. Therefore, the de-hierarchization processing unit 213 can hierarchize the attribute data so as to suppress a decrease in prediction accuracy. That is, the attribute information decoding unit 203 can correctly decode coded data encoded by a similar method. For example, the attribute information decoding unit 203 can correctly decode the coded data of the attribute data encoded by the attribute information encoding unit 104 described above. Therefore, a decrease in encoding efficiency can be suppressed.

<Flow of De-Hierarchization Processing>

Next, an example of a flow of the de-hierarchization processing executed in step S213 of FIG. 23 will be described with reference to a flowchart of FIG. 24.

When the de-hierarchization processing is started, in step S221, the de-hierarchization processing unit 213 performs the hierarchization processing of the attribute data (decoding result) using the geometry data (decoding result), restores the reference point and the prediction point of each hierarchy set on the encoding side, and further restores the reference relationship of each hierarchy. That is, the de-hierarchization processing unit 213 performs processing similar to the hierarchization processing performed by the hierarchization processing unit 111, sets the reference point and the prediction point of each hierarchy, and further sets the reference relationship of each hierarchy.

For example, similarly to the hierarchization processing unit 111, the de-hierarchization processing unit 213 applies the above-described "Method 1", derives a centroid of points, and sets a point close to the centroid as the reference point.

In step S222, the de-hierarchization processing unit 213 de-hierarchizes the attribute data (decoding result) using the hierarchical structure and the reference relationship, and restores the attribute data of each point. That is, the de-hierarchization processing unit 213 derives the predicted value of the attribute data of the prediction point from the attribute data of the reference point on the basis of the reference relationship, and adds the predicted value to the difference value of the attribute data (decoding result) to restore the attribute data.

Figure 23:
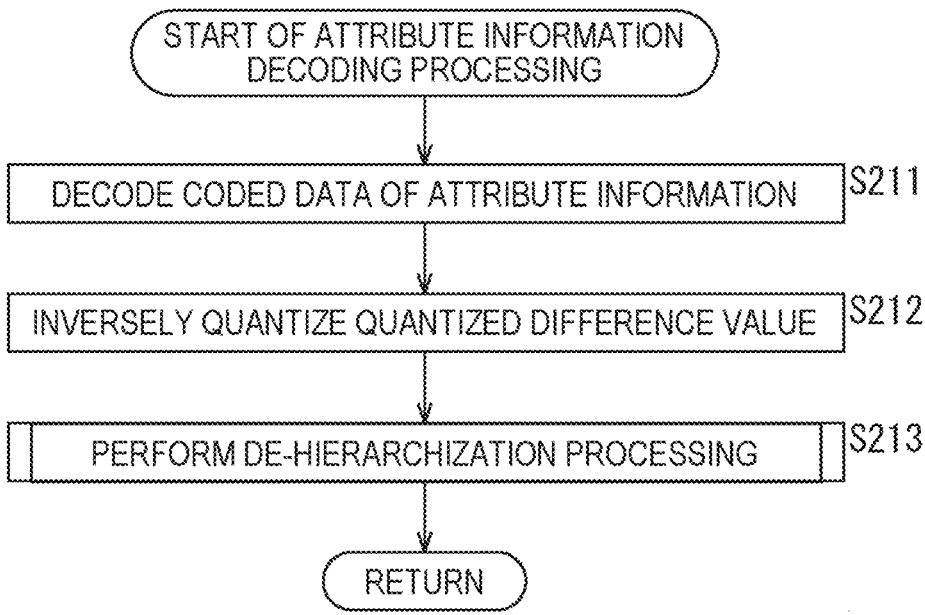
FIG. 23 is a flowchart describing an example of a flow of attribute information decoding processing.
Figure 24:
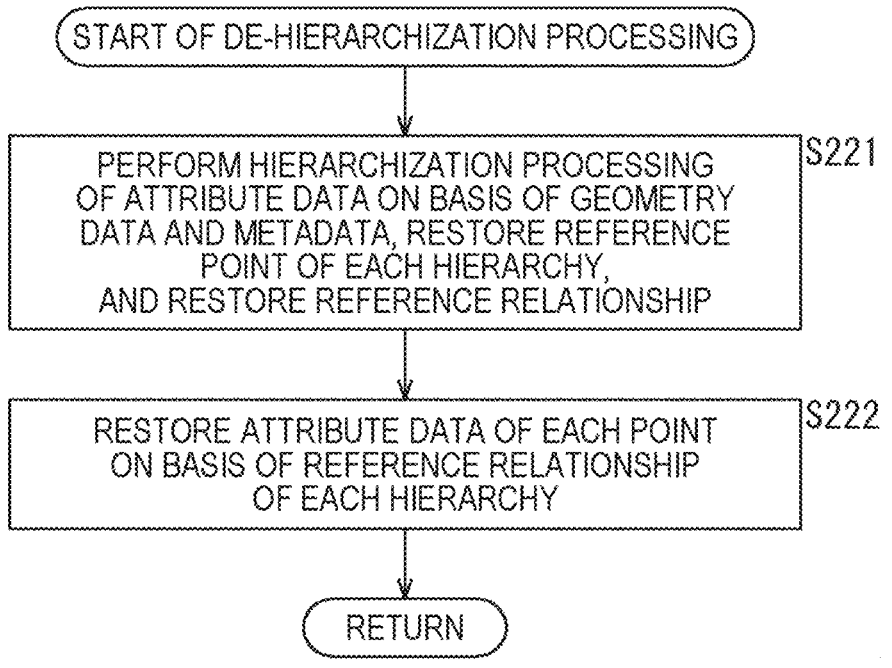
FIG. 24 is a flowchart describing an example of a flow of de-hierarchization processing.

When the processing of step S222 ends, the de-hierarchization processing ends, and the processing returns to FIG. 23.

By performing the processing of each step in this manner, the de-hierarchization processing unit 213 can achieve hierarchization similar to that at the time of encoding. That is, the attribute information decoding unit 203 can correctly decode coded data encoded by a similar method. For example, the attribute information decoding unit 203 can correctly decode the coded data of the attribute data encoded by the attribute information encoding unit 104 described above. Therefore, a decrease in encoding efficiency can be suppressed.

3. SECOND EMBODIMENT

<Method 2>

Next, a case of applying "Method 2" described above with reference to FIG. 6 will be described. In a case of "Method 2", in the hierarchization of the attribute data, the reference point is selected according to the distribution pattern (distribution mode) of points.

For example, in a table (table information) illustrated in FIG. 25, a distribution pattern (distribution mode) of points in a processing target region in which the reference point is set and information (index) indicating points selected in this case are associated with each other. For example, in the second row from the top of this table, it is illustrated that, in a case where the distribution pattern of points in a 2×2×2 voxel region in which the reference point is set is "10100001", a point with an index of "2", that is, a point that appears second is selected. Each bit value of the distribution pattern "10100001" indicates the presence or absence of a point in each voxel of 2×2×2, a value "1" indicates that a point exists in the voxel to which the bit is assigned, and a value "0" indicates that no point exists in the voxel to which the bit is assigned.

In this table, similarly, an index of a point to be selected is indicated for each distribution pattern. That is, in the hierarchization of the attribute data, the table is referred to, and the point of the index corresponding to the distribution pattern of points in the processing target region in which the reference point is set is selected as the reference point.

In this manner, the reference point can be more easily selected.

<Table Information>

The table information may be any information as long as it associates the distribution pattern of points with the information indicating points to be selected. For example, as in Method (1) illustrated in the second row from the top of the table of "Table" illustrated in A of FIG. 26, table information for selecting a point close to the centroid for each point distribution mode may be used. That is, an index of a point close to a centroid position in a case of the distribution pattern may be associated with each distribution pattern.

Furthermore, for example, as in Method (2) illustrated in the third row from the top of the table of "Table" illustrated in A of FIG. 26, table information for selecting an arbitrary point for each point distribution mode may be used. Moreover, for example, as in Method (3) illustrated in the fourth row from the top of the table of "Table", a table to be used may be selected from a plurality of tables. For example, the table to be used may be switched according to the hierarchy (depth of LoD).

<Signaling of Table Information>

Note that this table information may be prepared in advance. For example, predetermined table information may be defined by standards. In this case, signaling (transmission from the encoding side to the decoding side) of the table information is unnecessary.

Further, the position information decoding unit 102 may derive the table information from the geometry data. Furthermore, the position information decoding unit 202 may also derive the table information from the geometry data (decoding result). In this case, signaling (transmission from the encoding side to the decoding side) of the table information is unnecessary.

Of course, the table information may be generated (or updatable) by a user, an application, or the like. In that case, the generated (or updated) table information may be signaled. That is, for example, the encoding unit 113 may perform encoding the information regarding the table information and including coded data thereof in the bit stream, or the like, so as to perform the signaling.

Furthermore, as described above, the table information may be switched according to the hierarchy (depth of LoD). In that case, it may be performed such that, as in Method (1) illustrated in the second row from the top of the table of "Table" illustrated in B of FIG. 26, the switching method is defined in advance by standards or the like, and information indicating the switching method is not signaled.

Furthermore, an index (identification information) indicating the selected table may be signaled as in Method (2) illustrated in the third row from the top of the table of "Table" illustrated in B of FIG. 26. For example, this index may be signaled in an attribute parameter set (AttributeParameterSet).

Moreover, for example, the selected table information itself may be signaled as in Method (3) illustrated in the fourth row from the top of the table of "Table" illustrated in B of FIG. 26. For example, the table information may be signaled in an attribute brick header (AttributeBrickHeader).

Furthermore, a part of the selected table information may be signaled as in Method (4) illustrated in the fifth row from the top of the table of "Table" illustrated in B of FIG. 26. That is, the table information may be capable of being partially updated. For example, the table information may be signaled in the attribute brick header (AttributeBrickHeader).

Also in a case of applying this Method 2, the configurations of the encoding device 100 and the decoding device 200 are basically similar to those in the case of applying Method 1 described above. Therefore, the encoding device 100 can execute each processing such as the encoding processing, the attribute information encoding processing, and the hierarchization processing in a similar flow to that in the case of the first embodiment.

<Flow of Reference Point Setting Processing>

Figure 27:
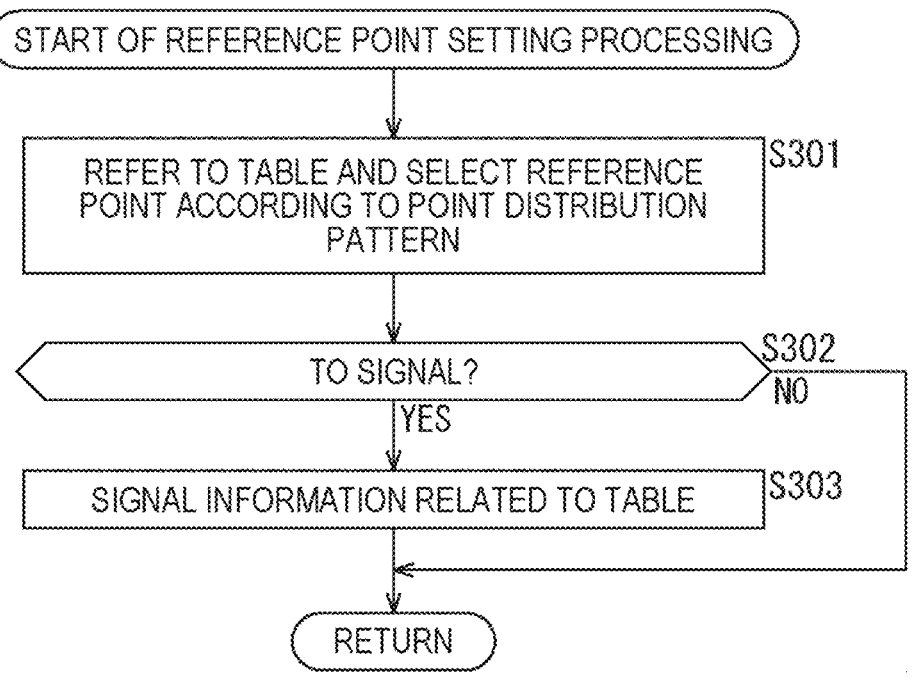
FIG. 27 is a flowchart describing an example of a flow of the reference point setting processing.

An example of a flow of the reference point setting processing in this case will be described with reference to a flowchart of FIG. 27. When the reference point setting processing is started, the reference point setting unit 121 refers to the table information and selects the reference point according to the point distribution pattern in step S301.

In step S302, the reference point setting unit 121 determines whether or not to signal information regarding the used table. In a case where it is determined to signal, the processing proceeds to step S303.

In step S303, the reference point setting unit 121 signals information regarding the used table. When the processing of step S303 ends, the reference point setting processing ends, and the processing returns to FIG. 18.

As the encoding device 100 transmits the table information in this manner, the decoding device 200 can perform decoding using the table information.

Note that the decoding device 200 can execute each processing such as decoding processing, attribute information decoding processing, and de-hierarchization processing in a similar flow to that in the case of the first embodiment.

4. THIRD EMBODIMENT

<Method 3>

Next, a case of applying "Method 3" described above with reference to FIG. 6 will be described. In the case of "Method 3", the reference point set in the hierarchization of the attribute data may be signaled.

Figure 29:
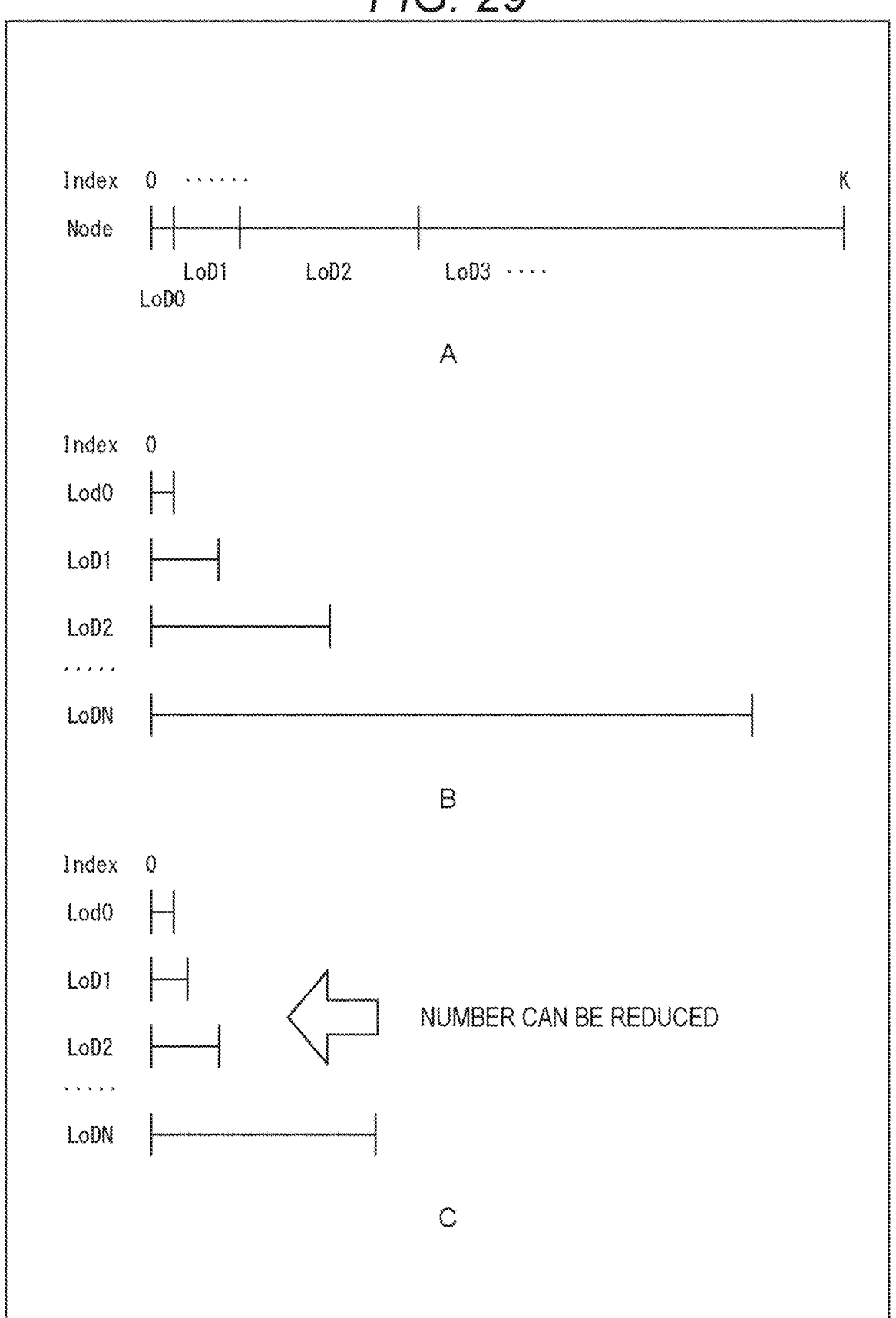
FIG. 29 is a diagram illustrating an example of a target of signaling.

For example, as in Method (1) illustrated in the second row from the top of the table of "target of signaling" illustrated in FIG. 28, information indicating whether or not to refer to for all nodes (all points), that is, whether to set the node as the reference point or the prediction point may be signaled. For example, as illustrated in A of FIG. 29, all the nodes in all the hierarchies may be sorted in the Morton order, and an index (index 0 to index K) may be assigned to each node. In other words, each node (and information given to each node) can be identified by the index 0 to the index K.

Furthermore, for example, as in Method (2) illustrated in the third row from the top of the table of the "target of signaling" illustrated in FIG. 28, information indicating which node (point) is referred to and selected as the reference point for a part of hierarchies may be signaled. For example, as illustrated in B of FIG. 29, a hierarchy (LoD) to be the target of signaling may be designated, all the nodes of the hierarchy may be sorted in the Morton order, and an index may be assigned to each node.

Figure 30:
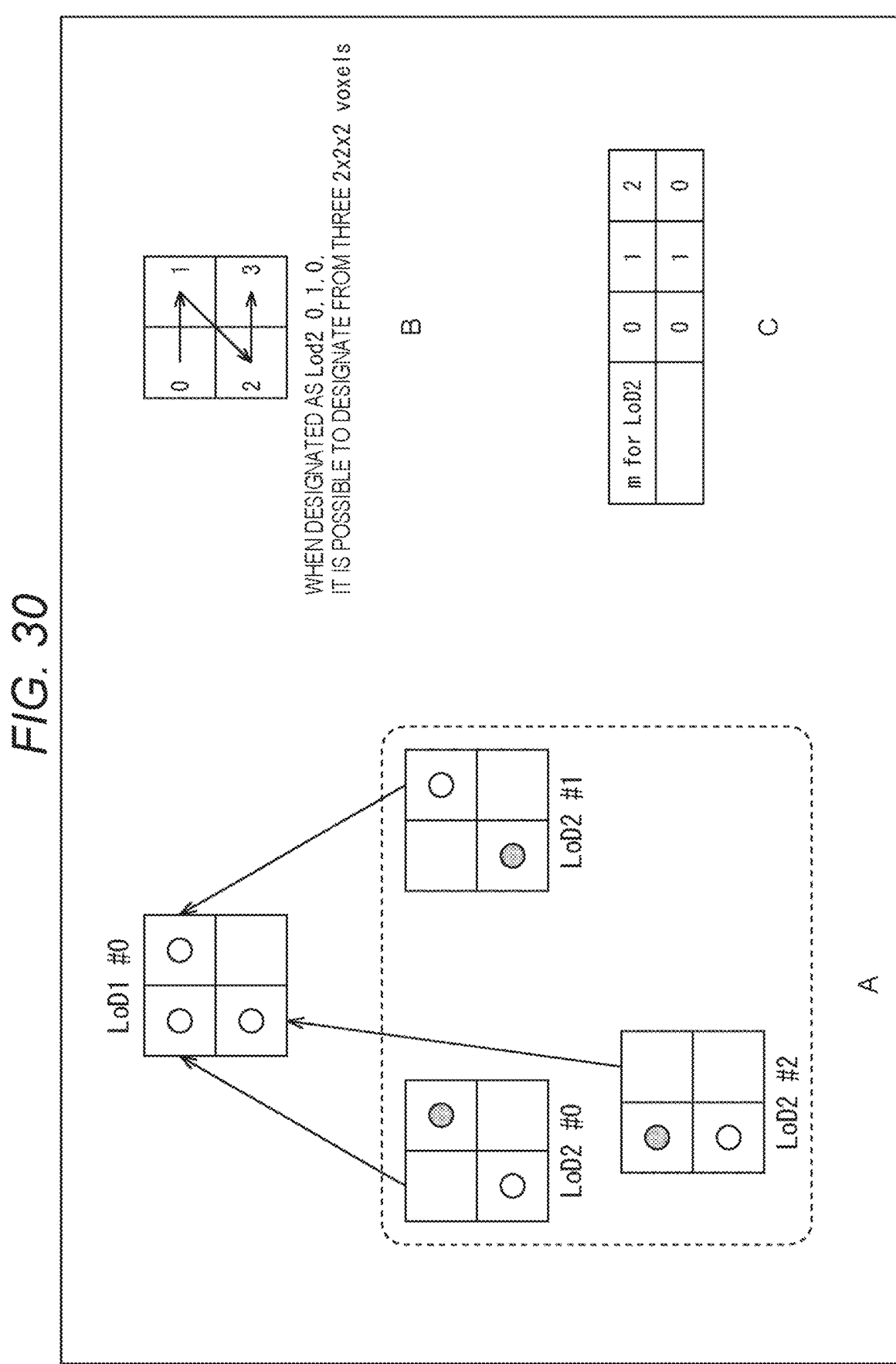
FIG. 30 is a diagram illustrating an example of information to be signaled.

For example, it is assumed that the attribute data has the hierarchical structure as illustrated in A of FIG. 30. That is, points are selected one by one as the reference point from a point of #0 of LoD2, a point of #1 of LoD2, and a point of #2 of LoD2, so as to form each point of #0 of LoD1. In this case, when the index is assigned to the point of LoD2 in the search order as illustrated in B of FIG. 30, each point of LoD1 #0 is indicated by the index of LoD2 as illustrated in C of FIG. 30. In other words, the distribution mode of the points of LoD1 #0 can be expressed by designating "LoD2 0, 1, 0".

In this manner, the 2×2×2 voxel region of LoD N can be designated by the index of LoD N−1. That is, one voxel of 2×2×2 can be designated by LoD (hierarchy designation) and order (m-th). In this manner, by performing designation by the hierarchy and the index, signaling can be performed only for a part of hierarchies as necessary, and thus it is possible to suppress an increase in the code amount and to suppress a decrease in the encoding efficiency as compared with the case of Method (1).

Moreover, for example, as in Method (3) illustrated in the fourth row from the top of the table of the "target of signaling" illustrated in FIG. 28, the points to be signaled may be limited by the number of points in the voxel region of N×N×N at the lower level. That is, the information regarding the setting of the reference point for the point satisfying the predetermined condition may be signaled. In this manner, as illustrated in C of FIG. 29, the number of nodes to be the target of signaling can be further reduced. Thus, a decrease in encoding efficiency can be suppressed.

Figure 31:
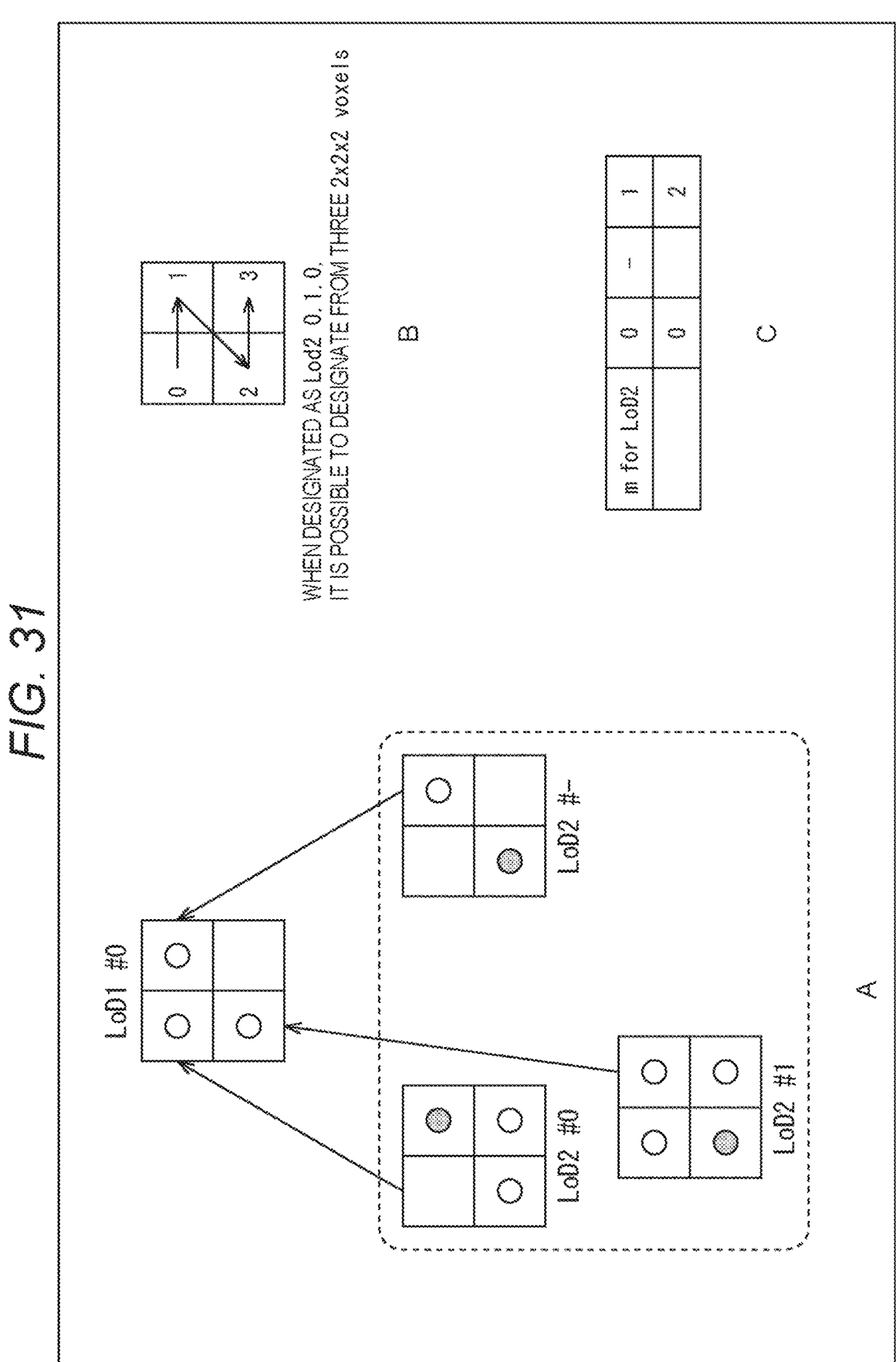
FIG. 31 is a diagram illustrating an example of information to be signaled.

For example, it is assumed that the attribute data has the hierarchical structure as illustrated in A of FIG. 31. In this case, the target of signaling is limited to a 2×2×2 voxel region including three or more points. When indexes are assigned to the points of LoD2 in the search order as illustrated in B of FIG. 31, the voxel region illustrated on the right side of LoD2 is excluded from the target of signaling. Therefore, no index is assigned to this voxel region. Therefore, as illustrated in C of FIG. 31, the data amount of the signaling can be reduced as compared with a case of C of FIG. 30, and an increase in the code amount can be suppressed.

Note that Method (2) and Method (3) may be applied in combination, for example, as in Method (4) illustrated in the fifth row from the top of the table of the "target of signaling" illustrated in FIG. 28.

<Fixed-Length Signaling>

Signaling as described above may be performed for data of a fixed-length. For example, signaling may be performed with syntax as illustrated in A of FIG. 32. In the syntax of A of FIG. 32, num_Lod is a parameter indicating the number of LoDs to be signaled. lodNo[i] is a parameter indicating the Lod number. voxelType[i] is a parameter indicating the type of voxel to be signaled. By designating this parameter, the transmission target in the Lod can be limited. num_node is a parameter indicating a number to be actually signaled. This num_node can be derived from geometry data. node[k] represents information signaled for each voxel region of 2×2×2. k represents a number of the node in the Morton order.

Note that in a case where parsing needs to be performed before geometry data is obtained for parallel processing or the like, signaling may be performed with the syntax illustrated in B of FIG. 32. In a case where the parsing is required as described above, it is only required to signal num_node.

Furthermore, in a case where the signaling is performed with data of a fixed length, the syntax illustrated in A of FIG. 33 may be applied. In this case, a flag Flag[k] for controlling the signal is signaled. Also in this case, when it is necessary to perform the parsing before the geometry data is obtained for parallel processing or the like, signaling may be performed with the syntax illustrated in B of FIG. 33. In a case where the parsing is required as described above, it is only required to signal num_node.

<Variable Length Signaling>

Furthermore, the signaling as described above may be performed with variable-length data. For example, as in the example of FIG. 34, the position of the node in the 2×2×2 voxel region may be signaled. In that case, the bit length of the signaling may be set according to the number of nodes in the 2×2×2 voxel region, for example, on the basis of the table information illustrated in A of FIG. 34.

On the decoding side, the number of nodes included in the 2×2×2 voxel region can be determined from the geometry data. Therefore, as in the example illustrated in B of FIG. 34, even if a bit string such as "10111010 . . . " is input, since the number of nodes included in the 2×2×2 voxel region can be grasped from the geometry data, it is possible to correctly obtain information for each voxel region by performing division with an appropriate bit length.

Furthermore, as in the example of FIG. 35, an index of the table information to be used may be signaled. In this case, the bit length of the signaling may be made variable according to the number of nodes in the 2×2×2 voxel region, for example, as illustrated in A of FIG. 35.

For example, in a case where the number of nodes is five to eight on the basis of the table information illustrated in A of FIG. 35, two bits are allocated, and the table information in B of FIG. 35 is selected. In this case, a bit string "00" indicates that the first node in the predetermined search order (for example, the Morton order) is selected. Furthermore, a bit string "01" indicates that the first node in a reverse order (reverce) of the predetermined search order (for example, the Morton order) is selected. Moreover, a bit string "10" indicates that the second node in the predetermined search order (no reverce) is selected. Furthermore, a bit string "11" indicates that the second node in the reverse order (reverce) of the predetermined search order is selected.

Furthermore, for example, in a case where the number of nodes is three or four on the basis of the table information illustrated in A of FIG. 35, one bit is allocated, and the table information in C of FIG. 35 is selected. In this case, a bit string "0" indicates that the first node in the predetermined search order (for example, the Morton order) is selected. Furthermore, a bit string "1" indicates that the first node in a reverse order (reverce) of the predetermined search order (for example, the Morton order) is selected.

On the decoding side, the number of nodes included in the 2×2×2 voxel region can be determined from the geometry data. Therefore, as in an example illustrated in D of FIG. 35, even if a bit string such as "10111010 . . . " is input, since the number of nodes included in the 2×2×2 voxel region can be grasped from the geometry data, it is possible to correctly obtain information for each voxel region by performing division with an appropriate bit length.

An example of syntax in the case of variable length is illustrated in FIG. 36. In the syntax of FIG. 36, bitLength is a parameter indicating a bit length. Furthermore, signalType [i] is a parameter indicating a method of variable length coding for each LoD.

Note that, also in the case of this variable length, when the parsing needs to be performed before the geometry data is obtained for parallel processing or the like, num_node may be signaled or flag[j] may be signaled as in syntax illustrated in FIG. 37.

<Flow of Reference Point Setting Processing>

Figure 38:
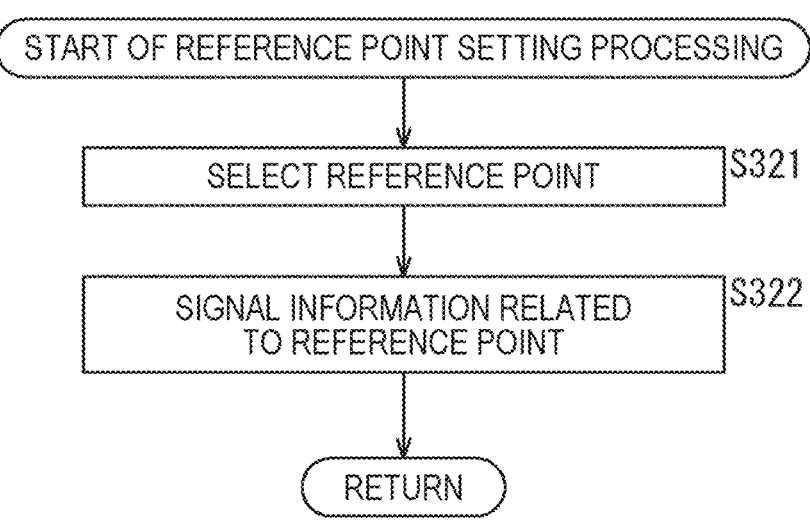
FIG. 38 is a flowchart describing an example of a flow of the reference point setting processing.

An example of a flow of the reference point setting processing in this case will be described with reference to a flowchart of FIG. 38. When the reference point setting processing is started, the reference point setting unit 121 selects the reference point in step S321.

In step S322, the reference point setting unit 121 signals information regarding the reference point set in step S321. When the processing of step S322 ends, the reference point setting processing ends, and the processing returns to FIG. 18. As the encoding device 100 transmits the table information in this manner, the decoding device 200 can perform decoding using the table information.

5. FOURTH EMBODIMENT

<Method 4>

Next, a case of applying "Method 4" described above with reference to FIG. 6 will be described. In the case of "Method 4", a point closer to the center of the bounding box and a point farther from the center of the bounding box among candidates for the reference point may be alternately selected for each hierarchy as the reference point.

Figure 39:
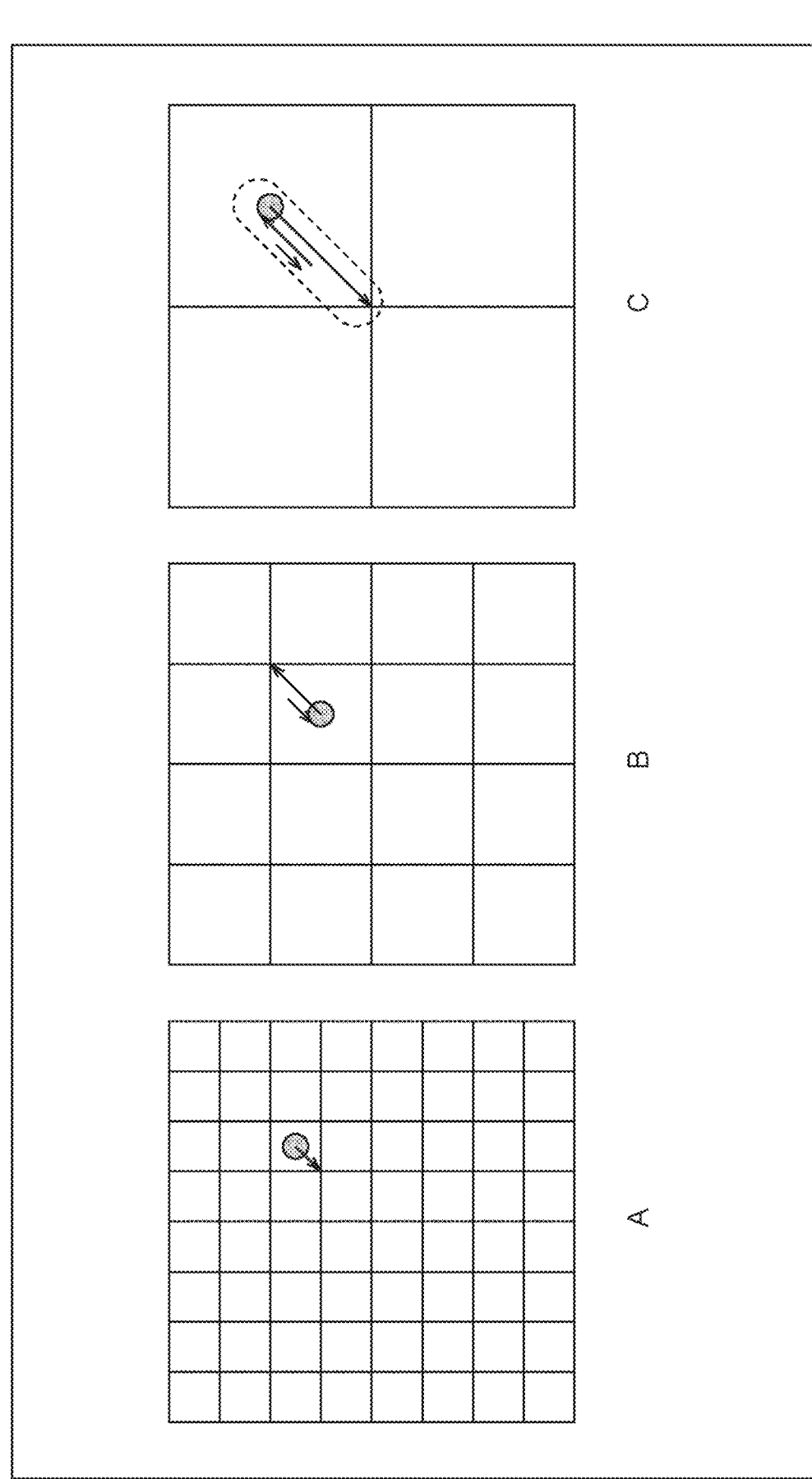
FIG. 39 is a diagram describing an example of a search order.

For example, in a case where the reference point is selected at a position illustrated in FIG. 39, a point closer to the center of the bounding box and a point farther from the center of the bounding box are alternately selected for each hierarchy as in A of FIG. 39 to C of FIG. 39. In this manner, as illustrated in C of FIG. 39, the movement range of the reference point is limited to a narrow range as indicated by a dotted frame, and thus a decrease in prediction accuracy is suppressed.

In this manner, by using the selection direction of the point as a reference of the center of the bounding box, it is possible to suppress a decrease in prediction accuracy regardless of the position in the bounding box.

Note that such point selection may be achieved by changing the search order of points according to the position in the bounding box. For example, this search order may be the order of distances from the center of the bounding box. In this manner, the search order can be changed according to the position in the bounding box. Furthermore, for example, the search order may be changed for each of eight divided regions obtained by dividing the bounding box into eight (two in each direction of xyz).

<Flow of Reference Point Setting Processing>

Figure 40:
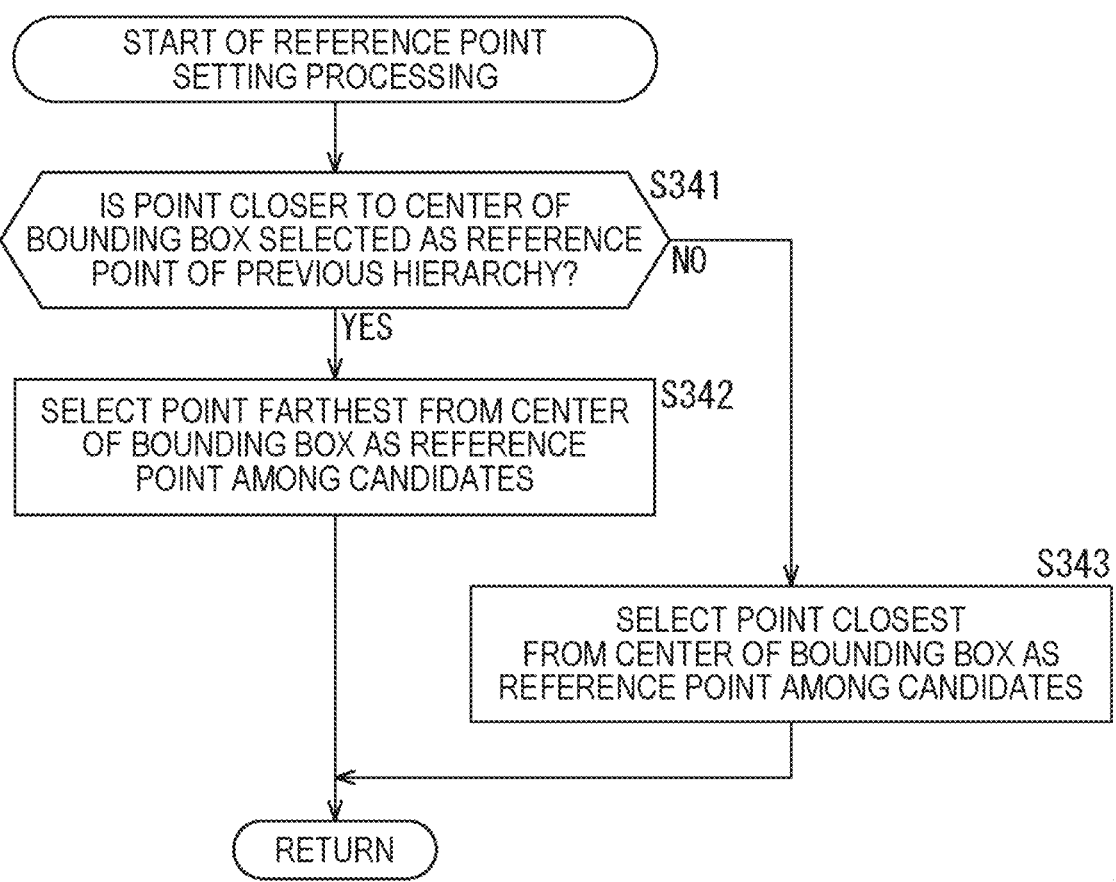
FIG. 40 is a flowchart describing an example of a flow of the reference point setting processing.

An example of a flow of the reference point setting processing in this case will be described with reference to a flowchart of FIG. 40. When the reference point setting processing is started, in step S341, the reference point setting unit 121 determines whether or not a point closer to the center of the bounding box has been selected as the reference point in the previous hierarchy.

In a case where it is determined that the closer point has been selected, the processing proceeds to step S342.

In step S342, the reference point setting unit 121 selects, as the reference point, a point farthest from the center of the bounding box among the reference point candidates. When the processing of step S342 ends, the reference point setting processing ends, and the processing returns to FIG. 18.

Furthermore, in a case where it is determined in step S341 that the closer point is not selected, the processing proceeds to step S343.

In step S343, the reference point setting unit 121 selects a point closest to the center of the bounding box among the reference point candidates as the reference point. When the processing of step S343 ends, the reference point setting processing ends, and the processing returns to FIG. 18.

By selecting the reference point in this manner, the encoding device 100 can suppress a decrease in prediction accuracy of the reference point. Thus, a decrease in encoding efficiency can be suppressed.

6. APPENDIX

<Method of Hierarchization and De-Hierarchization>

In the above description, the lifting has been described as an example of the method for hierarchizing and de-hierarchizing the attribute information, but the present technology can be applied to any technology for hierarchizing the attribute information. That is, the method of hierarchizing and de-hierarchizing the attribute information may be other than the lifting. Furthermore, the method of hierarchizing and de-hierarchizing the attribute information may be a scalable method as described in Non-Patent Document 3 or a non-scalable method.

<Control Information>

The control information regarding the present technology described in each of the above embodiments may be transmitted from the encoding side to the decoding side. For example, control information (for example, enabled_flag) that controls whether or not the application of the present technology described above is permitted (or prohibited) may be transmitted. Furthermore, for example, control information designating a range (for example, an upper limit or a lower limit of a block size or both thereof, a slice, a picture, a sequence, a component, a view, a layer, or the like) in which the application of the present technology described above is permitted (or prohibited) may be transmitted.

<Periphery and Vicinity>

Note that, in the present description, the positional relationship such as "vicinity" or "periphery" may include not only a spatial positional relationship but also a temporal positional relationship.

<Computer>

The series of processes described above can be executed by hardware or can be executed by software. In a case where the series of processes is executed by software, a program constituting the software is installed in a computer. Here, the computer includes a computer incorporated in dedicated hardware, a general-purpose personal computer for example that can execute various functions by installing various programs, and the like.

FIG. 41 is a block diagram illustrating a configuration example of hardware of a computer that executes the above-described series of processes by a program.

In a computer 900 illustrated in FIG. 41, a central processing unit (CPU) 901, a read only memory (ROM) 902, and a random access memory (RAM) 903 are interconnected via a bus 904.

An input-output interface 910 is also connected to the bus 904. An input unit 911, an output unit 912, a storage unit 913, a communication unit 914, and a drive 915 are connected to the input-output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface. The drive 915 drives a removable medium 921 such as a magnetic disk, an optical disk, a magneto-optical disk, or a semiconductor memory.

In the computer configured as described above, the CPU 901 loads, for example, a program stored in the storage unit 913 into the RAM 903 via the input-output interface 910 and the bus 904 and executes the program, so as to perform the above-described series of processes. The RAM 903 also appropriately stores data and the like necessary for the CPU 901 to execute various processes.

The program executed by the computer can be applied by being recorded in the removable medium 921 as a package medium or the like, for example. In this case, the program can be installed in the storage unit 913 via the input-output interface 910 by attaching the removable medium 921 to the drive 915.

Furthermore, this program can be provided via a wired or wireless transmission medium such as a local area network, the Internet, or digital satellite broadcasting. In this case, the program can be received by the communication unit 914 and installed in the storage unit 913.

In addition, this program can be installed in the ROM 902 or the storage unit 913 in advance.

<Applicable Target of the Present Technology>

Although the case where the present technology is applied to encoding and decoding of point cloud data has been described above, the present technology is not limited to these examples, and can be applied to encoding and decoding of 3D data of any standard. That is, as long as there is no contradiction with the present technology described above, specifications of various types of processing such as encoding and decoding methods and various types of data such as 3D data and metadata are arbitrary. Furthermore, as long as there is no contradiction with the present technology, a part of processes and specifications described above may be omitted.

Furthermore, in the above description, the encoding device 100 and the decoding device 200 have been described as application examples of the present technology, but the present technology can be applied to any configuration.

For example, the present technology can be applied to various electronic devices such as a transmitter and a receiver (for example, a television receiver and a mobile phone) in satellite broadcasting, cable broadcasting such as cable TV, distribution on the Internet, and distribution to a terminal by cellular communication, or the like, or a device (for example, a hard disk recorder and a camera) that records an image on a medium such as an optical disk, a magnetic disk, and a flash memory, or reproduces an image from the storage medium.

Furthermore, for example, the present technology can also be implemented as a configuration of a part of the device, such as a processor (for example, a video processor) as a system large scale integration (LSI) or the like, a module (for example, a video module) using a plurality of processors or the like, a unit (for example, a video unit) using a plurality of modules or the like, or a set (for example, a video set) obtained by further adding other functions to a unit.

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service related to an image (moving image) to any terminal such as a computer, an audio visual (AV) device, a portable information processing terminal, or an Internet of Things (IoT) device.

Note that in the present description, the system means a set of a plurality of components (devices, modules (parts), and the like), and it does not matter whether or not all the components are in the same housing. Therefore, a plurality of devices housed in separate housings and connected via a network, and one device in which a plurality of modules is housed in one housing are all systems.

<Field and Application to Which Present Technology is Applicable>

Note that the system, device, processing unit, and the like to which the present technology is applied can be used in any fields, for example, traffic, medical care, crime prevention, agriculture, livestock industry, mining, beauty, factory, household appliance, weather, nature monitoring, and the like. Furthermore, its use is arbitrary.

OTHERS

Note that in the present description, the "flag" is information for identifying a plurality of states, and includes not only information used for identifying two states of true (1) or false (0), but also information that can identify three or more states. Therefore, the value that this "flag" can take may be, for example, two values of 1 and 0, or three or more values. That is, the number of bits constituting this "flag" is arbitrary, and may be one bit or a plurality of bits. Furthermore, identification information (including the flag) is assumed to include not only identification information thereof in a bit stream but also difference information of the identification information with respect to a certain reference information in the bit stream, and thus, in the present description, the "flag" and "identification information" include not only the information thereof but also the difference information with respect to the reference information.

Furthermore, various types of information (metadata and the like) related to the coded data (bit stream) may be transmitted or recorded in any form as long as the information is associated with the coded data. Here, the term "associate" means, for example, that one piece of data can be used (linked) when the other piece of data is processed. That is, the data associated with each other may be combined as one piece of data or may be individual pieces of data. For example, information associated with coded data (image) may be transmitted on a transmission path different from that of the coded data (image). Furthermore, for example, the information associated with the coded data (image) may be recorded in a recording medium (or another recording area of the same recording medium) different from the coded data (image). Note that this "association" may be a part of data instead of the entire data. For example, an image and information corresponding to the image may be associated with each other in an arbitrary unit such as a plurality of frames, one frame, or a part of the frame.

Note that in the present description, terms such as "combine", "multiplex", "add", "integrate", "include", "store", "put in", "plug in", and "insert" mean to combine a plurality of items into one, for example, such as combining coded data and metadata into one piece of data, and mean one method of the above-described "association".

Furthermore, the embodiments of the present technology are not limited to the above-described embodiments, and various modifications are possible without departing from the scope of the present technology.

For example, a configuration described as one device (or processing unit) may be divided and configured as a plurality of devices (or processing units). Conversely, configurations described above as a plurality of devices (or processing units) may be combined and configured as one device (or processing unit). Furthermore, a configuration other than those described above may of course be added to the configuration of each device (or each processing unit). Moreover, if the configuration and operation of the entire system are substantially the same, a part of the configuration of a certain device (or processing unit) may be included in the configuration of another device (or another processing unit).

Furthermore, for example, the above-described program may be executed in any device. In that case, it is sufficient if the device has necessary functions (functional blocks and the like) and can acquire necessary information.

Furthermore, for example, each step of one flowchart may be executed by one device, or may be shared and executed by a plurality of devices. Moreover, in a case where a plurality of processes is included in one step, the plurality of processes may be executed by one device, or may be shared and executed by a plurality of devices. In other words, a plurality of processes included in one step can be executed as processes of a plurality of steps. Conversely, a process described as a plurality of steps can be collectively executed as one step.

Furthermore, for example, in the program executed by the computer, processing of steps describing the program may be executed in time series in the order described in the present description, or may be executed in parallel or individually at necessary timing such as when a call is made. That is, as long as no contradiction occurs, the processes in the respective steps may be executed in an order different from the above-described orders. Moreover, the processes in steps for describing this program may be executed in parallel with processes in another program, or may be executed in combination with processes in another program.

Furthermore, for example, a plurality of technologies related to the present technology can be implemented independently as a single body as long as there is no contradiction. Of course, any plurality of the present technologies can also be used and implemented in combination. For example, part or all of the present technologies described in any of the embodiments can be implemented in combination with part or all of the present technologies described in other embodiments. Furthermore, part or all of any of the above-described present technologies can be implemented by using together with another technology that is not described above.

Note that the present technology can have configurations as follows.

(1) An information processing device including:

a hierarchization unit that, for attribute information of each point of a point cloud that represents an object having a three-dimensional shape as a set of points, hierarchizes the attribute information by recursively repeating classification of a prediction point for deriving a difference value between the attribute information and a predicted value of the attribute information and a reference point used for deriving the predicted value with respect to the reference point, in which the hierarchization unit sets the reference point on the basis of a centroid of points.

(2) The information processing device according to (1), in which the hierarchization unit sets, as the reference point, a point closer to the centroid among candidate points.

(3) The information processing device according to (1) or (2), in which the hierarchization unit sets the reference point on the basis of a centroid of points located within a predetermined range.

(4) The information processing device according to any one of (1) to (3), in which the hierarchization unit sets the reference point on the basis of a predetermined search order from among a plurality of candidates under a substantially same condition with respect to the centroid.

(5) An information processing method including:

when performing, for attribute information of each point of a point cloud that represents an object having a three-dimensional shape as a set of points, hierarchization of the attribute information by recursively repeating classification of a prediction point for deriving a difference value between the attribute information and a predicted value of the attribute information and a reference point used for deriving the predicted value with respect to the reference point, setting the reference point on the basis of a centroid of points.

(6) An information processing device including:

a hierarchization unit that, for attribute information of each point of a point cloud that represents an object having a three-dimensional shape as a set of points, hierarchizes the attribute information by recursively repeating classification of a prediction point for deriving a difference value between the attribute information and a predicted value of the attribute information and a reference point used for deriving the predicted value with respect to the reference point, in which the hierarchization unit sets the reference point on the basis of a distribution mode of points.

(7) The information processing device according to (6), in which the hierarchization unit sets the reference point on the basis of table information designating a point close to a centroid of points for each distribution mode of the points.

(8) The information processing device according to (6) or (7), in which the hierarchization unit sets the reference point on the basis of table information designating a predetermined point for each distribution mode of the points.

(9) The information processing device according to (8), further including an encoding unit that encodes information regarding the table information.

(10) An information processing method including:

when performing, for attribute information of each point of a point cloud that represents an object having a three-dimensional shape as a set of points, hierarchization of the attribute information by recursively repeating classification of a prediction point for deriving a difference value between the attribute information and a predicted value of the attribute information and a reference point used for deriving the predicted value with respect to the reference point, setting the reference point on the basis of a distribution mode of points.

(11) An information processing device including:

a hierarchization unit that, for attribute information of each point of a point cloud that represents an object having a three-dimensional shape as a set of points, hierarchizes the attribute information by recursively repeating classification of a prediction point for deriving a difference value between the attribute information and a predicted value of the attribute information and a reference point used for deriving the predicted value with respect to the reference point; and an encoding unit that encodes information regarding setting of the reference point by the hierarchization unit.

(12) The information processing device according to (11), in which the encoding unit encodes information regarding setting of the reference points for all points.

(13) The information processing device according to (11), in which the encoding unit encodes information regarding setting of the reference points for points of a part of hierarchies.

(14) The information processing device according to (13), in which the encoding unit further encodes information regarding setting of the reference point for a point that satisfies a predetermined condition.

(15) An information processing method including:

hierarchizing, for attribute information of each point of a point cloud that represents an object having a three-dimensional shape as a set of points, the attribute information by recursively repeating classification of a prediction point for deriving a difference value between the attribute information and a predicted value of the attribute information and a reference point used for deriving the predicted value with respect to the reference point; and encoding information regarding setting of the reference point.

(16) An information processing device including:

a hierarchization unit that, for attribute information of each point of a point cloud that represents an object having a three-dimensional shape as a set of points, hierarchizes the attribute information by recursively repeating classification of a prediction point for deriving a difference value between the attribute information and a predicted value of the attribute information and a reference point used for deriving the predicted value with respect to the reference point, in which the hierarchization unit alternately selects, as the reference point, a point closer to a center of a bounding box and a point farther from the center of the bounding box among candidates for the reference point for each hierarchy.

(17) The information processing device according to (16), in which the hierarchization unit selects a point closer to the center of the bounding box and a point farther from the center of the bounding box among the candidates on the basis of a search order according to a position in the bounding box.

(18) The information processing device according to (17), in which the search order is an order of distance from the center of the bounding box.

(19) The information processing device according to (17), in which the search order is set for each region obtained by dividing the bounding box into eight regions.

(20) An information processing method including:

when performing, for attribute information of each point of a point cloud that represents an object having a three-dimensional shape as a set of points, hierarchization of the attribute information by recursively repeating classification of a prediction point for deriving a difference value between the attribute information and a predicted value of the attribute information and a reference point used for deriving the predicted value with respect to the reference point, alternately selecting, as the reference point, a point closer to a center of a bounding box and a point farther from the center of the bounding box among candidates for the reference point for each hierarchy.

REFERENCE SIGNS LIST

100 Encoding device
101 Position information encoding unit
102 Position information decoding unit
103 Point cloud generation unit
104 Attribute information encoding unit
105 Bit stream generation unit
111 Hierarchization processing unit
112 Quantization unit
113 Encoding unit
121 Reference point setting unit
122 Reference relationship setting unit
123 Inversion unit
124 Weight value derivation unit
200 Decoding device
201 Coded data extraction unit
202 Position information decoding unit
203 Attribute information decoding unit
204 Point cloud generation unit
211 Decoding unit
212 Inverse quantization unit
213 De-hierarchization processing unit

The invention claimed is:

1. A decoding device comprising:

circuitry configured to:

derive geometry data of points of a point cloud representing a level-of-detail structure;

recursively classify, for each level-of-detail of the level-of-detail structure, the points into either prediction points, or a reference point closest to a centroid of a limited number of points, the limited number of points including the prediction points, wherein, in the recursive classification, the prediction points and the reference point are searched among candidate points in N×N×N rectangular voxel regions of a current level-of-detail of the level-of-detail structure, and wherein N is equal to or larger than 2; and derive attribute data corresponding to the geometry data by:

deriving a predicted value with respect to the reference point; and deriving, on a basis of the prediction points, a difference value between the attribute data and the predicted value.

2. The decoding device according to claim 1, wherein the circuitry is further configured to search, in the recursive classification, the prediction points and the reference point in accordance with a Morton order.

3. The decoding device according to claim 1, wherein the circuitry is further configured to retain, in the recursive classification, the reference point of the current level-of-detail of the level-of-detail structure for a lower-resolution level-of-detail.

4. A decoding method comprising:

deriving geometry data of points of a point cloud representing a level-of-detail structure;

recursively classifying, for each level-of-detail of the level-of-detail structure, the points into either prediction points, or a reference point closest to a centroid of a limited number of points, the limited number of points including the prediction points, wherein, in the recursive classification, the prediction points and the reference point are searched among candidate points in N×N×N rectangular voxel regions of a current level-of-detail of the level-of-detail structure, and wherein N is equal to or larger than 2; and deriving attribute data corresponding to the geometry data by:

deriving a predicted value with respect to the reference point; and deriving, on a basis of the prediction points, a difference value between the attribute data and the predicted value.

5. The decoding method according to claim 4, wherein the recursive classification includes searching the prediction points and the reference point in accordance with a Morton order.

6. The decoding method according to claim 4, wherein the recursive classification includes retaining the reference point of the current level-of-detail of the level-of-detail structure for a lower-resolution level-of-detail.

* * * * *